(12) United States Patent
Aoki et al.

(10) Patent No.: US 9,930,296 B2
(45) Date of Patent: Mar. 27, 2018

(54) IMAGE SWITCHING DEVICE FOR VEHICLE

(71) Applicant: DENSO CORPORATION, Kariya, Aichi-pref. (JP)

(72) Inventors: Kunitomo Aoki, Kariya (JP); Norio Ninomiya, Ageo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 302 days.

(21) Appl. No.: 14/941,746

(22) Filed: Nov. 16, 2015

(65) Prior Publication Data

US 2016/0142685 A1    May 19, 2016

(30) Foreign Application Priority Data

Nov. 18, 2014 (JP) ................................. 2014-233562
Oct. 15, 2015 (JP) ................................. 2015-203980

(51) Int. Cl.
*H04N 5/228* (2006.01)
*H04N 7/18* (2006.01)
*H04N 5/232* (2006.01)
*H04N 5/247* (2006.01)

(52) U.S. Cl.
CPC ......... *H04N 7/181* (2013.01); *H04N 5/23293* (2013.01); *H04N 5/247* (2013.01)

(58) Field of Classification Search
CPC ........... H04N 5/23248; H04N 5/23283; H04N 5/23258; G02B 27/646; G03B 5/00
USPC ....................................................... 348/208
See application file for complete search history.

(56) References Cited

U.S. PATENT DOCUMENTS 6,327,522 B1    12/2001  Kojima et al.
2014/0055615 A1*  2/2014  Chen .................... B62D 15/028
                                                    348/148

FOREIGN PATENT DOCUMENTS

| JP | 2001-071843 A | 3/2001 |
| JP | 4016768 B2 | 12/2007 |
| JP | 4370813 B2 | 11/2009 |
| JP | 2010-124300 A | 6/2010 |
| JP | 2012-220223 A | 11/2012 |

* cited by examiner

*Primary Examiner* — William C Vaughn, Jr.
*Assistant Examiner* — Daniel Tekle
(74) *Attorney, Agent, or Firm* — Harness, Dickey & Pierce, P.L.C.

(57) ABSTRACT

An image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device shortens the reference distance in a case where an absolute value of acceleration of the vehicle is a second value which is greater than a first value, compared to a case where the absolute value of acceleration of the vehicle is the first value.

1 Claim, 7 Drawing Sheets

IMAGE SWITCHING DEVICE FOR VEHICLE

CROSS REFERENCE TO RELATED APPLICATIONS

This application is based on Japanese Patent Applications No. 2014-233562 filed on Nov. 18, 2014, and No. 2015-203980 filed on Oct. 15, 2015, the disclosures of which are incorporated herein by reference.

TECHNICAL FIELD

The present disclosure relates to an image switching device for a vehicle.

BACKGROUND

Patent Literature 1 discloses a technique in which a distance from a hindrance to a vehicle is detected and an image captured by an in-vehicle infrared light camera is displayed based on the fact that the detection distance becomes shorter than a reference distance. Patent Literature 1 also discloses a technique in which the reference distance varies in accordance with a vehicle speed, an operation cycle of a windshield wiper, and an operational state of a fog lamp switch.

Among on-board cameras, there is a known on-board camera (hereinafter, referred to as a CCM camera) which is attached to an end portion on one side in a vehicle-width direction and a front end portion, and captures images of the one side in the vehicle-width direction and the front side. As the CCM camera, for example, there is a corner view camera mounted in Lexus (registered trademark) manufactured and sold by Toyota Motor Corporation.

One ideal aim of image displaying is to automatically display an image captured by the on-board camera when a driver desires to see and to automatically prohibit the image from being displayed when the driver desires not to see, thereby realizing image displaying which is useful for the driver without interfering with the driver. The inventor has examined in consideration of the ideal aim thereof that there is room for controlling of the reference distance by a method other than that disclosed in Patent Literature 1.

[Patent Literature 1] JP-2001-71843 A (corresponding to U.S. Pat. No. 6,327,522 B1))

SUMMARY

According to a first aspect of the present disclosure, a threshold value is set in an image switching device for a vehicle which displays an image captured by an on-board camera, based on the fact that a distance from an object to a vehicle becomes shorter than a reference distance by using a new method which is unprecedented in the related art.

The inventor has examined that a CCM camera is also desired to show a captured image to an occupant of the vehicle at suitable timing the occupant desires to see instead of showing the captured image at all times. According to a second aspect of the present disclosure, there is provided an image switching device for a vehicle which shows an image captured by the CCM camera to an occupant of the vehicle at suitable timing.

According to a first aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device shortens the reference distance in a case where an absolute value of acceleration of the vehicle is a second value which is greater than a first value, compared to a case where the absolute value of acceleration of the vehicle is the first value.

In this case, a driver is likely to make sudden movement and stop in a familiar parking space compared to other parking spaces, and the necessity of displaying an image captured by the on-board camera is low in the parking space familiar to the driver. For example, the driver approaches the familiar parking space at a higher speed compared to a case of approaching other parking spaces and makes a sudden stop, and thus, deceleration in a forward-backward direction (a value obtained by counterchanging the positive and negative factors of acceleration in the forward-backward direction) increases. For example, the driver in the familiar parking space is likely to make a relatively sudden acceleration, even after a stop is made once when straightening a steering wheel. Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a second aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device lengthens the reference distance in a case where a steered angle of the vehicle is a second angle which is greater than a first angle, compared to a case where the steered angle of the vehicle is the first angle.

In this case, the image display device is desirably caused to more actively display an image captured by the on-board camera since the importance of external information on the vicinity of the vehicle increases when the driver widely turns the steering wheel. Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a third aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device increases the detection distance based on a feature that the image display device does not display the image captured by the on-board camera when a setting selector switch is operated, and decreases the detection distance based on a feature that the image display device displays the image captured by the on-board camera when the setting selector switch is operated.

The reason the driver operates the setting selector switch when the image display device does not display an image captured by the on-board camera is that the image display device displays nothing from the on-board camera when the driver feels the necessity thereof. Therefore, in such a case, opportunities of displaying an image captured by the on-board camera are increased by increasing the reference distance. The reason the driver operates the setting selector switch when the image display device displays an image captured by the on-board camera is that the image display device displays an image from the on-board camera when the driver does not feel the necessity thereof. Therefore, in such a case, opportunities of displaying an image captured by the on-board camera are decreased by decreasing the reference distance. Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a fourth aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device decreases the detection distance in a case where a blinker is in operation compared to a case where the blinker is not in operation.

In this case, the necessity of causing the image display device to display an image captured by the on-board camera and attracting the attention of the driver is low since the driver naturally pays attention to the surroundings of the vehicle when operating the blinker operation switch so as to cause the blinker to be in operation. Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a fifth aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device changes the detection distance in accordance with a type of a place where a current position of the vehicle belongs to.

In this case, there is a case where the necessity of causing the image display device to display an image captured by the on-board camera and attracting the attention of the driver is low depending on the type of the place where the current position of the vehicle belongs (for example, a parking lot). Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a sixth aspect of the present disclosure, an image switching device for a vehicle includes: a reference distance determination device that determines a reference distance; and a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance. The reference distance determination device increases the detection distance in a case where the vehicle receives hindrance information on a road or from road traffic-equipment which is installed on the road, compared to a case where the vehicle does not receive the hindrance information on the road.

In this case, the driver can be actively alerted by displaying an image captured by the on-board camera in circumstances where the driver needs to be watchful due to generation of the hindrance information, for example. Therefore, the possibility of excessively frequent displaying of an image captured by the on-board camera in the parking space familiar to the driver is reduced by determining the reference distance as described above. In addition, the threshold value is set through the new method which is unprecedented in the related art in the image switching device for a vehicle displaying an image captured by the on-board camera, based on the fact that the distance from an object to the vehicle becomes shorter than the reference distance.

According to a seventh aspect of the present disclosure, an image switching device for a vehicle includes: a CCM camera off device that controls an image display device inside a vehicle so as to prevent a captured image captured by a CCM camera, which is attached to an attachment position at an end portion on one side in a vehicle-width direction and a front end portion of the vehicle and captures an image of the one side in the vehicle-width direction and a front side from the attachment position, from being displayed to an occupant of the vehicle; and a CCM camera on device that controls the image display device so as to allow the captured image captured by the CCM camera to be displayed to the occupant of the vehicle. The CCM camera on device controls the image display device so as to allow the captured image captured by the CCM camera to be displayed to the occupant of the vehicle during a period of time a shift position of the vehicle is switched from a reverse position to a position other than the reverse position and the position other than the reverse position is maintained.

In this case, a captured image captured by the CCM camera is displayed to the occupant of the vehicle during the period of time the shift position of the vehicle is switched from the reverse position to a position other than the reverse position and the position other than the reverse position is maintained. The inventor has examined that the circumstances where the shift position of the vehicle is switched from the reverse position to a position other than the reverse position are quite possibly the circumstances where the driver intends to move the vehicle forward after reversely moving the vehicle once. The reason the vehicle is reversely moved once is quite possibly to avoid a hindrance which may come into contact with the front end on the one side in the vehicle-width direction. Therefore, displaying a captured image captured by the CCM camera to the occupant during the period of time the shift position is switched from the reverse position to a position other than the reverse position and the position other than the reverse position is maintained is greatly beneficial in order to allow the occupant to grasp the position of the hindrance. Therefore, in the above-described manner, an image captured by the CCM camera is capable of being shown to the occupant of the vehicle at suitable timing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
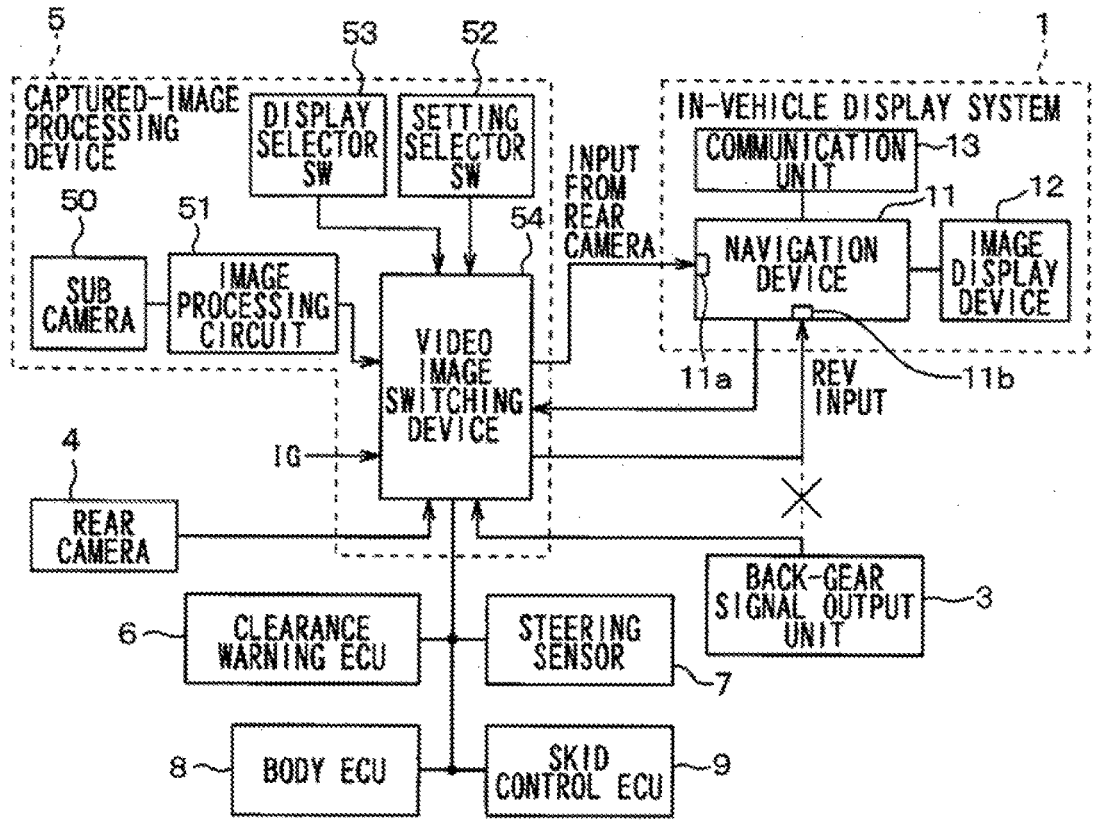
FIG. 1 is a configuration diagram of a vehicle-system according to First Embodiment.

Hereinafter, First Embodiment will be described. As illustrated in FIG. 1, a vehicle-system according to the present embodiment is mounted in a vehicle and includes an in-vehicle display system 1, a back-gear signal output unit 3, a rear camera 4, a captured-image processing device 5, a clearance warning ECU 6, a steering sensor 7, a body ECU 8, a skid control ECU 9, and the like.

The in-vehicle display system 1 includes a navigation device 11, an image display device 12, and a communication unit 13. The navigation device 11 specifies a current position of the vehicle based on a signal from a known sensor inside the vehicle (a GPS receiver, an acceleration sensor, a vehicle speed sensor, a yaw rate sensor, and the like). The navigation device 11 calculates a guidance route from the current position to a destination which is set by a user. The navigation device 11 generates a map image of the surroundings of the current position based on map data. The navigation device 11 causes the image display device 12 to display the map image thereof, and the guidance route is emphatically displayed on the map.

The navigation device 11 specifies the type of the place where the current position belongs based on the map data. The navigation device 11 outputs the specified type information to a video image switching device 54. As the type of a place, for example, there are a parking lot, an expressway, a congested road, and a road which is neither an expressway nor a congested road. It is determined whether or not a road is a congested road based on traffic information which is received from an external traffic information server by using the communication unit 13.

The communication unit 13 receives the aforementioned traffic information and real-time information regarding circumstances of an infrastructure by communicating with a communication device (a beacon installed on the shoulder of a road, a central server installed at a remote location, and the like) on the infrastructure side. The infrastructure is a generic term referring to a road and road traffic-equipment (a signal device, an automatic toll collection system-gate, and the like) which is installed on the road.

When real-time information regarding circumstances of an infrastructure is received through the communication unit 13, the navigation device 11 determines whether or not infrastructure hindrance information indicating the generation of a hindrance in an infrastructure at a particular location is included in the real-time information. As the infrastructure hindrance information, for example, there are traffic accident information on the road at a particular location, fallen object information on the road at a particular location, construction information on the road at a particular location, and fault information on a signal device at a particular location.

When it is determined that the infrastructure hindrance information is included, the navigation device 11 also extracts only the infrastructure hindrance information on a hindrance which exists within a predetermined distance (for example, 1 km) from a current position in a traveling direction on the road where a host vehicle is currently traveling, from the infrastructure hindrance information. The traveling direction denotes a direction along the guidance route when the guidance route is set, and denotes a straight forward direction along the road when the guidance route is not set. The navigation device 11 outputs the extracted infrastructure hindrance information to the video image switching device 54.

When a shift position of the vehicle is set to a reverse position, that is, when a drive position is set to R, the back-gear signal output unit 3 outputs an ON signal. When the shift position of the vehicle is set to a position other than the reverse position, that is, when the drive position is set to D, N, P, or the like, the back-gear signal output unit 3 outputs an OFF signal.

The rear camera 4 is an on-board camera which is attached to the rear (for example, the rear end portion) of the vehicle, captures an image of the rear from the vehicle, and outputs an analog video image signal of the captured image.

The captured-image processing device 5 is a device to which an analog video image signal of an image captured by the rear camera 4 is input, and in which an image captured by the rear camera 4 and an image based on a captured image which is captured by another on-board camera (a sub camera 50 described below) other than the rear camera 4 are switched, thereby outputting the result as an analog video image signal.

An input terminal included in the navigation device 11 will be described. The navigation device 11 has a rear-video image input terminal 11a and an REV input terminal 11b. The rear-video image input terminal 11a is originally a video image input terminal intended for a direct input of an analog video image signal of a captured image output by the rear camera 4. However, in the present embodiment, an analog video image signal output by the captured-image processing device 5 is directly input to the rear-video image input terminal 11a.

The REV input terminal 11b is originally a signal input terminal intended for a direct input of a signal output by the back-gear signal output unit 3. However, in the present embodiment, a pseudo back-gear signal output by the captured-image processing device 5 is directly input thereto.

The following is an operation of the navigation device 11 when an analog video image signal of a captured image output by the rear camera 4 is input to the rear-video image input terminal 11a and a signal output by the back-gear signal output unit 3 is input to the REV input terminal 11b as originally intended. Only when the shift position of the vehicle is set to the reverse position, the image display device 12 is caused to display an image captured by the rear camera 4. When the shift position of the vehicle is set to a position other than the reverse position, that is, when the drive position is set to D, N, P, or the like, the image display device 12 is prohibited from displaying an image captured by the rear camera 4.

In order to realize the operation, the navigation device 11 of the present embodiment causes the image display device 12 to display an image which is input to the rear-video image input terminal 11a only when a signal input to the REV input terminal 11b is turned on. The navigation device 11 thereof prohibits the image display device 12 from displaying an image which is input to the rear-video image input terminal 11a when a signal input to the REV input terminal 11b is turned off.

The captured-image processing device 5 will be described in more detail. The captured-image processing device 5 has the sub camera 50, an image processing circuit 51, a setting selector switch 52, a display selector switch 53, and the video image switching device 54.

The sub camera 50 is a corner clearance monitor camera (that is, a CCM camera) which captures an image in a direction different from that of the rear camera 4. The sub camera 50 is attached to an attachment position at an end portion on one side in a vehicle-width direction and a front end portion. The sub camera 50 captures an image of the one side in the vehicle-width direction and a front side from the attachment position. The one side denotes a direction on a side where a front passenger seat is present, in the vehicle-width direction. Accordingly, the image-capturing range of the sub camera 50 covers the end portion on the one side in the vehicle-width direction and the front end portion, and the one side in the vehicle-width direction and the front side viewed from the vehicle.

The captured images which are repeatedly captured by the sub camera 50 are input to the image processing circuit 51. The image processing circuit 51 appropriately performs processing of the captured images input from the sub camera 50, thereby outputting the result to the video image switching device 54.

Both the setting selector switch 52 and the display selector switch 53 are push-button switches which are attached to positions in the vicinity of a driver's seat inside the vehicle and which a user (that is, a driver) can operate. The video image switching device 54 is a known microcomputer having CPU, RAM, ROM, I/O, and the like (not illustrated).

Clearance sonar (not illustrated), provided at the end portion on the one side in the vehicle-width direction of a front bumper of the vehicle, is connected to the clearance warning ECU 6. The clearance sonar utilizes ultrasonic waves so as to detect an object (for example, a hindrance) in the vicinity of the front left end portion of the vehicle and to detect the distance from the object to the front left end portion of the vehicle. The clearance warning ECU 6 acquires the detection results of the clearance sonar. When the distance from an object to the front left end portion of the vehicle is equal to or less than a setting value which is set in advance, the clearance warning ECU 6 generates a warning sound in the vehicle. The clearance warning ECU 6 transmits information on the distance from an object to the front left end portion of the vehicle to the video image switching device 54 via an intra-vehicle LAN 10 or direct wiring.

The steering sensor 7 detects a steered angle of the vehicle resulted by an operation of the driver, thereby transmitting information on the steered angle which is a detection result to the video image switching device 54 via the intra-vehicle LAN 10 or the direct wiring. The steered angle denotes an angle in which the steering wheel is turned clockwise or counterclockwise from a home position (a position at which the vehicle travels straight forward). In this case, the angle is a positive value in both the clockwise turning and the counterclockwise turning.

The body ECU 8 is a unit which controls doors, blinkers (direction indicators), lights, and the like of the vehicle. The body ECU 8 is connected to a gear position sensor (not illustrated) which detects a gear position of the vehicle and a blinker operation switch. The body ECU 8 transmits gear position information which is a detection result of the gear position sensor to the video image switching device 54 via the intra-vehicle LAN 10 or the direct wiring. The body ECU 8 controls the operation of the blinkers (lights on and lights out) in accordance with operation contents of the blinker operation switch performed by the driver and transmits information on the operation state of the blinkers to the video image switching device 54 via the intra-vehicle LAN 10 or the direct wiring.

When the driver performs an operation of storing a door mirror of the vehicle (for example, an operation of pressing a storage button), the body ECU 8 transmits storing operation generation information to the video image switching device 54.

When the driver performs an operation of starting parking support (for example, an operation of pressing a parking support start button), the body ECU 8 starts performing parking support. When performing parking support, in order to park the vehicle at a target parking position, the body ECU 8 may instruct the driver to start reverse motion of the vehicle, to start forward movement thereof, to control the steering angle, and the like by speech or an image using a known technique, for example. In addition, when performing parking support, the body ECU 8 may cause the vehicle to be automatically parked at a target parking position by controlling operations and movement of the vehicle using a known technique, for example.

The body ECU 8 is capable of controlling a cornering lamp which is disposed at the front end on the one side in the vehicle-width direction. The cornering lamp is an auxiliary lamp which is provided independently from a headlamp and illuminates a road surface diagonally in front on the one side from the one side in the vehicle-width direction. The body ECU 8 turns on the cornering lamp based on the fact that the direction indicator on the one side in the vehicle-width direction is operated. The body ECU 8 transmits lighting information on the cornering lamp on the one side in the vehicle-width direction to the video image switching device 54.

A brake fluid sensor, a wheel speed sensor, the acceleration sensor, a brake pedal stroke sensor, and the like (not illustrated) are connected to the skid control ECU 9, which controls braking force of the vehicle based on detection signals from the sensors. Accordingly, an antilock brake system (ABS) for achieving stable braking, electronic brake force distribution (EBD) for optimally distributing braking power of the front and rear wheels in accordance with driving circumstances, electronic stability control (ESC), and the like are realized. The skid control ECU 9 transmits vehicle speed information specified based on a signal from the wheel speed sensor, to the video image switching device 54 via the intra-vehicle LAN 10 or the direct wiring. The skid control ECU 9 transmits information on acceleration of the vehicle in the forward-backward direction specified based on a signal from the acceleration sensor, to the video image switching device 54 via the intra-vehicle LAN 10 or the direct wiring.

Hereinafter, operations of the vehicle-system having the above-described configuration will be described. The video image switching device 54 concurrently executes pseudo back-gear signal control processing illustrated in FIG. 2 and display control processing illustrated in FIG. 3 while a main switch of the vehicle is turned on.

The above-referenced main switch is a switch that causes a power source (an internal-combustion engine, an electric motor, and the like) generating power by which the vehicle travels to be able to be activated. As the main switch, for example, there are an ignition switch of a vehicle which travels by power of the internal-combustion engine, and a main power switch which allows the electric motor supplying power for traveling to an electric car to be electrified.

First, the pseudo back-gear signal control processing of FIG. 2 will be described. The video image switching device 54 first determines in Step S110 during the pseudo back-gear signal control processing whether or not a back-gear signal output from the back-gear signal output unit 3 is turned on. When the back-gear signal is not turned on (is turned off), the procedure proceeds to Step S120, and when the back-gear signal is turned on, the procedure proceeds to Step S130.

It is determined in Step S120 whether or not the displaying state of the sub camera is ON. The displaying state of the sub camera is a state of whether or not the image display device 12 displays an image which is captured by the sub camera 50 and is processed and output from the image processing circuit 51. When the state is ON, displaying is performed, and when the state is OFF, displaying is not performed. ON-OFF of the displaying state of the sub camera is determined in Steps S240 and S260 during the display control processing of FIG. 3. When the state is ON, the procedure proceeds to Step S130, and when the state is OFF, the procedure proceeds to Step S140. OFF is the initial value of the displaying state of the sub camera immediately after the main switch is turned on.

The pseudo back-gear signal is turned on in Step S130, and the procedure returns to Step S110. The pseudo back-gear signal is turned off in Step S140, and the procedure returns to Step S110.

In this manner, the video image switching device 54 turns on the pseudo back-gear signal when any one or both the back-gear signal from the back-gear signal output unit 3 and the displaying state of the sub camera are ON. Consequently, a signal input to the REV input terminal 11$b$ is turned on, and the navigation device 11 thereby causes the image display device 12 to display an image which is input to the rear-video image input terminal 11$a$.

The video image switching device 54 turns off the pseudo back-gear signal when both the back-gear signal from the back-gear signal output unit 3 and the displaying state of the sub camera are OFF. Consequently, a signal input to the REV input terminal 11$b$ is turned off, and the navigation device 11 thereby prohibits the image display device 12 from displaying an image which is input to the rear-video image input terminal 11$a$.

Next, the display control processing of FIG. 3 will be described. The video image switching device 54 first determines a reference distance D in Step S210 during the display control processing. The method of determining the reference distance D will be described later.

Subsequently, it is determined in Step S220 whether or not the displaying state of the sub camera is ON. When it is determined to be OFF (that is, when being in a state where the image display device 12 does not display an image captured by the sub camera), the procedure proceeds to Step S230. When it is determined to be ON (that is, when being in a state where the image display device 12 displays an image captured by the sub camera), the procedure proceeds to Step S250.

It is determined in Step S230 whether or not a detection distance is equal to or less than the reference distance D (same as the reference distance D or smaller than the reference distance D). The detection distance is a most recent value of the distance from an object to the front left end portion of the vehicle transmitted from the clearance warning ECU 6.

When it is determined that the detection distance is equal to or less than the reference distance D, the procedure proceeds to Step S240. The displaying state of the sub camera is set to be ON, and an analog video image signal depicting an image which is captured by the sub camera 50 and is processed and output from the image processing circuit 51 starts being output to the rear-video image input terminal 11$a$. In this case, when an analog video image signal depicting an image which is captured by the sub camera and is output from the rear camera 4 is output to the rear-video image input terminal 11a, the output thereof is stopped. After Step S240, the procedure returns to Step S210.

When it is determined in Step S230 that the detection distance is not equal to or less than the reference distance D, the displaying state of the sub camera is maintained to be OFF, and while a source of a signal output to the rear-video image input terminal 11a is maintained without being switched, the procedure returns to Step S210. The source of a signal output to the rear-video image input terminal 11a is an image captured by the sub camera 50 or an image captured by the rear camera 4.

It is determined in Step S250 whether or not the detection distance exceeds a distance D+H which is obtained by adding a hysteresis value H (a positive value) to the reference distance D. When it is determined that the detection distance exceeds the distance D+H, the procedure proceeds to Step S260, and the displaying state of the sub camera is thereby set to be OFF. In addition, an analog video image signal depicting an image which is captured by the sub camera 50 and is processed and output from the image processing circuit 51 is stopped being output to the rear-video image input terminal 11a. Furthermore, an analog video image signal depicting an image which is captured by the sub camera and is output from the rear camera 4 starts being output to the rear-video image input terminal 11a. After Step S260, the procedure returns to Step S210.

When it is determined in Step S250 that the detection distance does not exceed the distance D+H, the displaying state of the sub camera is maintained to be ON, and while a source of a signal output to the rear-video image input terminal 11a is maintained without being switched, the procedure returns to Step S210.

In this manner, when the displaying state of the sub camera is OFF during the display control processing, the video image switching device 54 prohibits the image display device 12 from displaying an image captured by the sub camera 50, based on the fact that the detection distance is longer than the reference distance D (NO in Step S230). Specifically, an image captured by the sub camera 50 is not output to the rear-video image input terminal 11a. In this case, since the displaying state of the sub camera is OFF, when the back-gear signal is turned on during the pseudo back-gear signal control processing of FIG. 2, the video image switching device 54 turns on the pseudo back-gear signal, and when the back-gear signal is turned off, the pseudo back-gear signal is turned off. Therefore, even though the video image switching device 54 inputs an image captured by the rear camera 4 to the rear-video image input terminal 11a, a result of whether or not the image display device 12 displays an image captured by the rear camera 4 varies in accordance with ON-OFF of the back-gear signal.

When the displaying state of the sub camera is OFF, the image display device 12 is allowed to perform displaying by outputting an image captured by the sub camera 50 to the rear-video image input terminal 11a, based on the fact that the detection distance is equal to or less than the reference distance D (YES in Step S230). In this case, since the displaying state of the sub camera is switched to be ON, the pseudo back-gear signal is inevitably turned on during the pseudo back-gear signal control processing of FIG. 2. Accordingly, the image display device 12 displays an image captured by the sub camera 50, and thus, the driver can visually recognize the image thereof.

In other words, the driver has no chance to see an image captured by the sub camera 50 until the distance from an object to the front left end portion of the vehicle becomes equal to or less than the reference distance D, and the driver can see an image captured by the sub camera 50 at the point in time the distance to the front left end portion of the vehicle becomes equal to or less than the reference distance D.

When the displaying state of the sub camera is ON during the display control processing, the video image switching device 54 prohibits the image display device 12 from displaying an image captured by the sub camera 50, based on the fact that the detection distance is longer than the distance D+H (YES in Step S250). When the displaying state of the sub camera is ON, the image display device 12 is allowed to perform displaying by outputting an image captured by the sub camera 50 to the rear-video image input terminal 11a, based on the fact that the detection distance is equal to or less than the distance D+H (NO in Step S250). In this case, since the displaying state of the sub camera is switched to be ON, the pseudo back-gear signal is inevitably turned on during the pseudo back-gear signal control processing of FIG. 2. Accordingly, the image display device 12 displays an image captured by the sub camera 50, and thus, the driver can visually recognize the image thereof.

In other words, after the image display device 12 displays an image captured by the sub camera 50 once, the driver can see an image captured by the sub camera 50 through the image display device 12 until the distance from an object to the front left end portion of the vehicle exceeds the distance D+H. When the distance from an object to the front left end portion of the vehicle exceeds the distance D+H, the image display device 12 no longer displays an image captured by the sub camera 50. In this manner, the distance D+H functions as a second reference distance.

Figure 4:
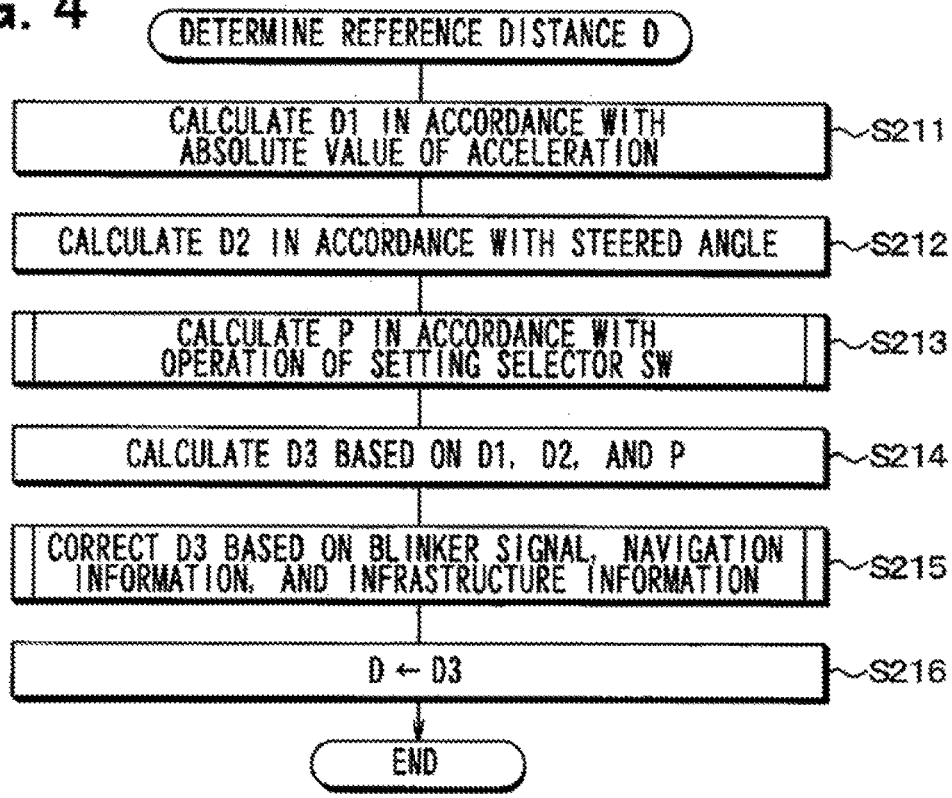
FIG. 4 is a flow chart of reference distance determination processing.

Reference distance D determination processing in Step S210 will be described in detail. As illustrated in FIG. 4, the video image switching device 54 first calculates a first temporary reference distance D1 in accordance with the absolute value of acceleration of the vehicle in the forward-backward direction in Step S211 during the reference distance D determination processing.

Figure 5:
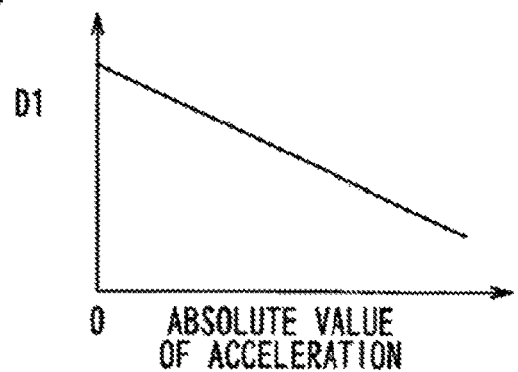
FIG. 5 is a graph illustrating a relationship between an absolute value of acceleration and a first temporary reference distance.

Specifically, as illustrated in FIG. 5, the first temporary reference distance D1 is determined so as to cause the first temporary reference distance D1 to be shortened as the absolute value of acceleration increases. As a result thereof, when an arbitrary value is referred to as a first value and another arbitrary value greater than the first value is referred to as second deceleration with respect to the absolute value of acceleration, the first temporary reference distance D1 becomes smaller in a case where the absolute value of acceleration of the vehicle is the second value compared to a case where the absolute value of acceleration thereof is the first value.

The reason for this is that the driver is likely to make sudden movement and stop in a familiar parking space compared to other parking spaces, and the necessity of displaying an image captured by the sub camera 50 is low in the parking space familiar to the driver.

For example, the driver approaches the familiar parking space at a higher speed compared to a case of approaching other parking spaces and makes a sudden stop, and thus, deceleration in a forward-backward direction (a value obtained by counterchanging the positive and negative factors of acceleration in the forward-backward direction) increases. For example, the driver in the familiar parking space is likely to make a relatively sudden acceleration, even after a stop is made once when straightening a steering wheel.

Therefore, the possibility of excessively frequent displaying of an image captured by the sub camera 50 in the parking space familiar to the driver is reduced by determining the first temporary reference distance D1 as described above.

In order to realize such an aim, as the absolute value of acceleration of the vehicle applied to determine a current first temporary reference distance D1, the absolute value of the most recent value of information on acceleration of the vehicle in the forward-backward direction transmitted from the skid control ECU 9 may be employed. Otherwise, a representative value (for example, the maximum value or an average value) of the absolute value of acceleration of the vehicle in the forward-backward direction transmitted from the skid control ECU 9 during a period of time from a predetermined point in time in the past (for example, 20 seconds before the present) to the present may be employed. In the latter case, when there is sudden acceleration or deceleration during the period of time from a predetermined point in time in the past to the present, the first temporary reference distance D1 is not minimized, even when the vehicle is brought to a stop in the parking process. Accordingly, the first temporary reference distance D1 is capable of being stably controlled throughout the entire parking process.

Figure 6:
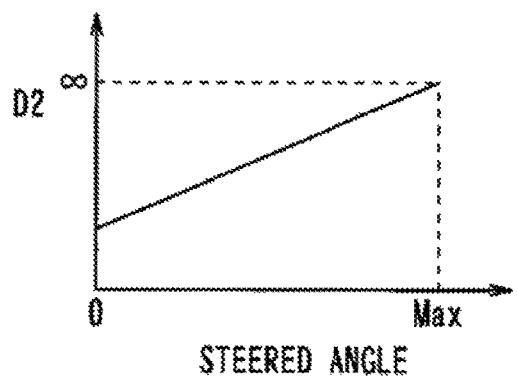
FIG. 6 is a graph illustrating a relationship between a steered angle and a second temporary reference distance.

Subsequently, a second temporary reference distance D2 is calculated in Step S212 in accordance with the steered angle. Specifically, as illustrated in FIG. 6, the second temporary reference distance D2 is determined so as to cause the second temporary reference distance D2 to be lengthened as the steered angle increases. As the steered angle which is applied in order to determine the second temporary reference distance D2, the most recent value of information on the steered angle transmitted from the steering sensor 7 is employed.

As a result thereof, when an arbitrary steered angle is referred to as a first angle and another arbitrary steered angle greater than the first angle is referred to as a second angle, the second temporary reference distance D2 becomes greater in a case where the steered angle of the vehicle is the second angle compared to a case where the steered angle thereof is the first angle. For example, when the steered angle is the maximum value (that is, the steered angle when the steering wheel is turned to the maximum), the second temporary reference distance D2 is set to a value corresponding to the infinite value (for example, a value greater than the detectable limit distance of the clearance sonar).

The reason for this is that the image display device 12 is desirably caused to more actively display an image captured by the sub camera 50 since the importance of information on the vicinity of a dead angle such as a corner portion of the vehicle increases when the driver widely turns the steering wheel.

Figure 7:
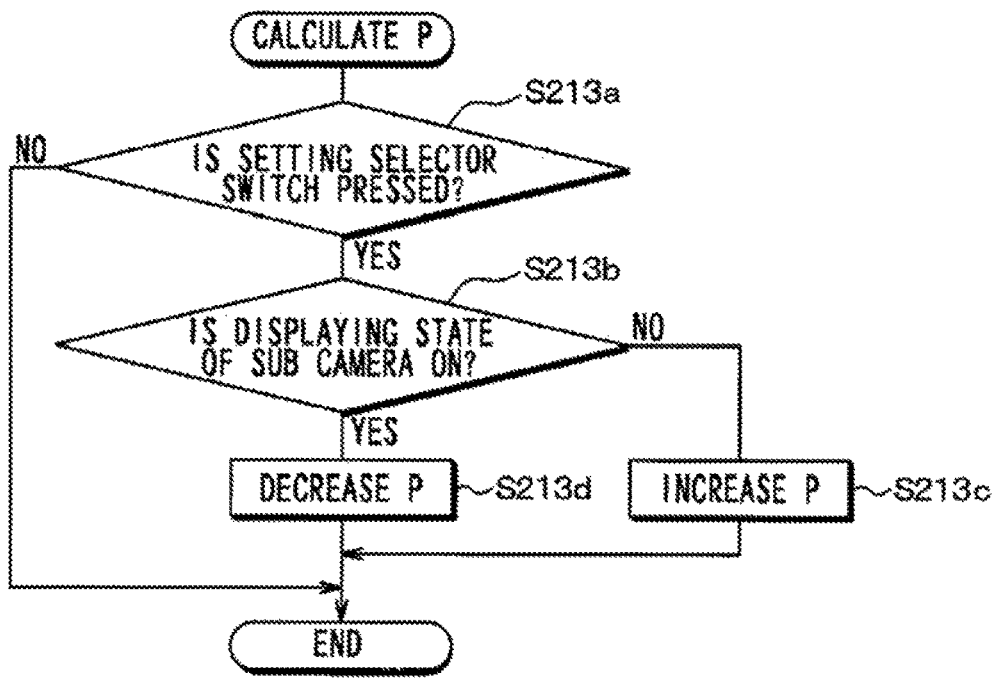
FIG. 7 is a flow chart of processing of calculating a temporary off-set distance.

Subsequently, the processing of FIG. 7 is performed in Step S213 so as to calculate the temporary off-set distance P in accordance with the operation contents of the setting selector switch 52. The temporary off-set distance P is stored in a non-volatile memory in the video image switching device 54. Since the value is retained, even though the main switch of the vehicle is turned off, the preference of a user is reflected for a long time. The initial value of the temporary off-set distance P at the time of shipment of the captured-image processing device 5 is zero.

Hereinafter, the processing of FIG. 7 will be described. First, it is determined in Step S213a whether or not the setting selector switch 52 is newly pressed. The status of whether or not the setting selector switch 52 is newly pressed is determined by whether or not a current stage of executing Step S213 is the first stage of executing Step S213 after the last press of the setting selector switch 52.

When it is determined that the setting selector switch 52 is newly pressed, the procedure proceeds to Step S213b, and when it is determined that the setting selector switch 52 is not newly pressed, the processing of FIG. 7 ends without changing the value of the temporary off-set distance P.

It is determined in Step S213b whether or not the displaying state of the sub camera is ON. When the state is OFF, the procedure proceeds to Step S213c, and when the state is ON, the procedure proceeds to Step S213d. The value of the temporary off-set distance P is increased by a certain value in Step S213c, thereby ending the processing of FIG. 7. In addition, the value of the temporary off-set distance P is decreased by a certain value in Step S213d, thereby ending the processing of FIG. 7.

As a result thereof, the video image switching device 54 increases the temporary off-set distance P to the higher level based on the fact that the image display device 12 does not display an image captured by the sub camera 50 when the setting selector switch 52 is operated. In addition, the temporary off-set distance P is decreased to the lower level based on the fact that the image display device 12 displays an image captured by the sub camera 50 when the setting selector switch 52 is operated.

The reason the driver operates the setting selector switch 52 when the image display device 12 does not display an image captured by the sub camera 50 is that the image display device 12 displays nothing from the sub camera 50 when the driver feels the necessity thereof. Therefore, in such a case, opportunities of displaying an image captured by the sub camera 50 are increased by increasing the temporary off-set distance P.

The reason the driver operates the setting selector switch 52 when the image display device 12 displays an image captured by the sub camera 50 is that the image display device 12 displays an image from the sub camera 50 when the driver does not feel the necessity thereof. Therefore, in such a case, opportunities of displaying an image captured by the sub camera 50 are decreased by decreasing the temporary off-set distance P.

Subsequently, a third temporary reference distance D3 is calculated in Step S214 based on the first temporary reference distance D1, the second temporary reference distance D2, and the temporary off-set distance P calculated in Steps S211, S212, and S213 performed immediately before thereof. The third temporary reference distance D3 is a value obtained by adding the temporary off-set distance P to a value based on the first temporary reference distance D1 and the second temporary reference distance D2. As the value based on the first temporary reference distance D1 and the second temporary reference distance D2, the average value of the first temporary reference distance D1 and the second temporary reference distance D2 may be applied, or a weighted average value such as $0.4 \times D1 + 0.6 \times D2$ may be applied.

Otherwise, as the value based on the first temporary reference distance D1 and the second temporary reference distance D2, the greater value between the first temporary reference distance D1 and the second temporary reference distance D2 may be applied. In this case, the value based on the first temporary reference distance D1 and the second temporary reference distance D2 may become the first temporary reference distance D1 itself or the value thereof may become the second temporary reference distance D2 itself.

The third temporary reference distance D3 may be a value obtained by adding the temporary off-set distance P to the second temporary reference distance D2, regardless of the first temporary reference distance D1. In addition, the third temporary reference distance D3 may be a value obtained by adding the temporary off-set distance P to the first temporary reference distance D1, regardless of the second temporary reference distance D2.

Figure 8:
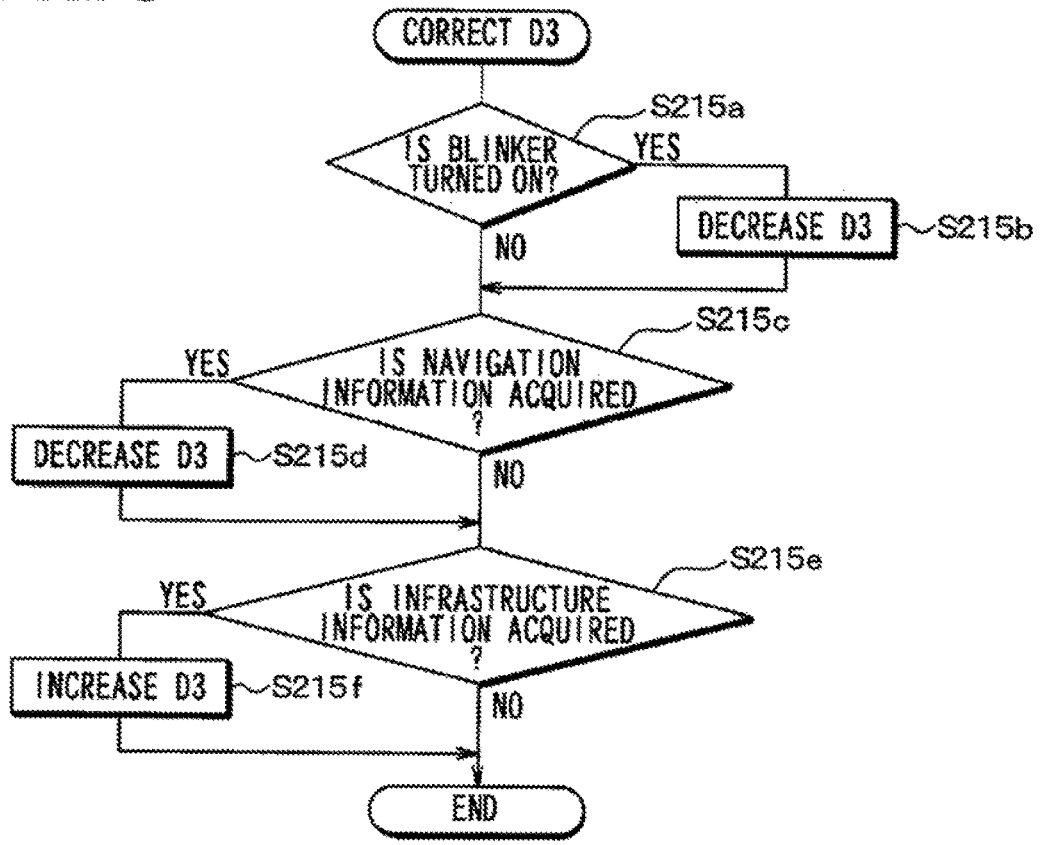
FIG. 8 is a flow chart of processing of correcting a third temporary reference distance.

Subsequently, processing illustrated in FIG. 8 is executed in Step S215, thereby correcting the third temporary reference distance D3 based on a blinker signal, navigation information, and infrastructure information.

Specifically, it is first determined in Step S215a whether or not the blinker is in operation, based on the most recent value of information on the operation state of the blinker transmitted from the body ECU 8. When it is determined to be in operation, the procedure proceeds to Step S215b, and when it is determined not to be in operation, the procedure bypasses Step S215b and proceeds to Step S215c.

The value of the third temporary reference distance D3 is decreased by a certain value in Step S215b. Thereafter, the procedure proceeds to Step S215c. In this manner, the video image switching device 54 decreases the value of the third temporary reference distance D3 in a case where the blinker is in operation compared to a case where the blinker is not in operation.

The reason for this is that the necessity of causing the image display device 12 to display an image captured by the sub camera 50 and attracting the attention of the driver is low since the driver naturally pays attention to the vicinity of the corner portion of the vehicle when operating the blinker operation switch so as to cause the blinker to be in operation. As a result thereof, the possibility of excessively frequent displaying of an image captured by the sub camera 50 is reduced.

It is determined in Step S215c whether or not information indicating that the vehicle is within a parking lot is acquired from the navigation device 11 based on the most recent value of information on the type of the place where the current position belongs output from the navigation device 11. When it is determined that the information indicating that the vehicle is within the parking lot is acquired from the navigation device 11, the procedure proceeds to Step S215d, and when it is determined that no information is acquired, the procedure bypasses Step S215d and proceeds to Step S215e.

The value of the third temporary reference distance D3 is decreased by a certain value in Step S215d. Thereafter, the procedure proceeds to Step S215e. In this manner, the video image switching device 54 decreases the value of the third temporary reference distance D3 in a case where the information indicating that the vehicle is within the parking lot is acquired from the navigation device 11 compared to a case where no information is acquired therefrom. In other words, the value of the third temporary reference distance D3 varies based on the type of the place where the current position of the vehicle belongs.

The reason for this is that the necessity of causing the image display device 12 to display an image captured by the sub camera 50 and attracting the attention of the driver is low since other objects such as other vehicles naturally exist near the host vehicle in a parking lot. In other words, there is a case where the necessity of causing the image display device 12 to display an image captured by the sub camera 50 and attracting the attention of the driver is low depending on the type of the place where the current position of the vehicle belongs. As a result thereof, the possibility of excessively frequent displaying of an image captured by the sub camera 50 is reduced.

It is determined in Step S215e whether or not the infrastructure hindrance information is output from the navigation device 11 to the video image switching device 54. As described above, the infrastructure hindrance information output from the navigation device 11 to the video image switching device 54 is the infrastructure hindrance information on a hindrance which exists within a predetermined distance from the current position in the traveling direction on the road where the host vehicle is currently traveling. When it is determined to be output, the procedure proceeds to Step S215f. When it is determined not to be output, the procedure bypasses Step S215f, thereby ending the processing of FIG. 8.

The value of the third temporary reference distance D3 is increased by a certain value in Step S215f. Thereafter, the processing of FIG. 8 ends. In this manner, the video image switching device 54 increases the value of the third temporary reference distance D3 in a case where the infrastructure hindrance information within a predetermined distance is received from the communication device outside the vehicle on the infrastructure side (via the navigation device 11) compared to a case where no information is acquired therefrom.

As a result thereof, the driver can be actively alerted by displaying an image captured by the sub camera 50 in circumstances where the driver needs to be watchful due to generation of the infrastructure hindrance information, for example.

Subsequently to Step S215, the current value of the third temporary reference distance D3 is substituted for a value of the reference distance D in Step S216. After Step S216, the processing of FIG. 4 ends.

In a case where the display selector switch 53 is pressed when the displaying state of the sub camera is OFF, the video image switching device 54 activates a compulsory display mode which compulsively causes the image display device 12 to display an image captured by the sub camera 50, regardless of both the detection distance and the reference distance. In a case where the display selector switch 53 is pressed during the compulsory display mode, the compulsory display mode is cancelled, thereby returning to the normal mode (the mode complying with the processing of FIGS. 2 and 3).

In a case where the display selector switch 53 is pressed when the displaying state of the sub camera is ON, the video image switching device 54 activates a compulsory non-display mode which compulsively causes the image display device 12 not to display an image captured by the sub camera 50, regardless of both the detection distance and the reference distance. In a case where the display selector switch 53 is pressed during the compulsory non-display mode, the compulsory non-display mode is cancelled, thereby returning to the normal mode.

Figure 3:
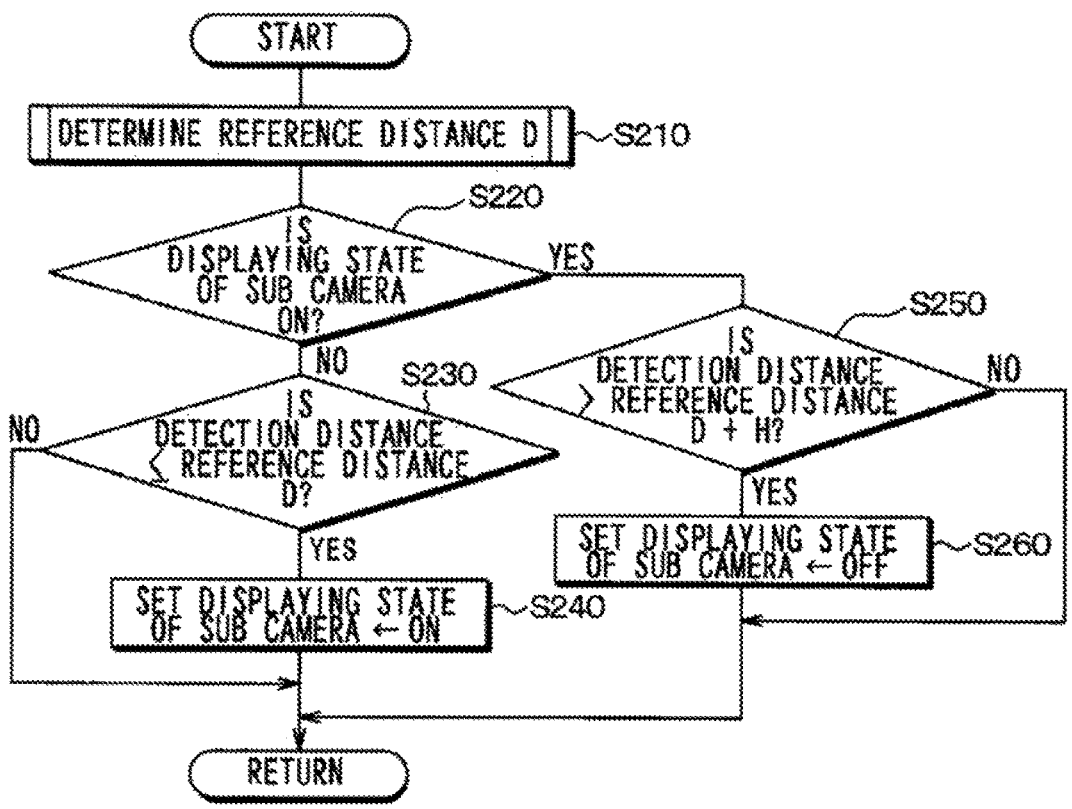
FIG. 3 is a flow chart of display control processing.

In the present embodiment, the video image switching device 54 functions as an example of a reference distance determination device by executing Step S210 of FIG. 3, and functions as an example of a determination device by executing Steps S220 to S260.

Second Embodiment

Next, Second Embodiment will be described. The only difference between a vehicle-system of the present embodiment and the vehicle-system of First Embodiment is the contents of processing performed by a video image switching device 54. Specifically, the video image switching device 54 of the present embodiment performs pseudo back-gear signal control processing illustrated in FIG. 2 similar to that of First Embodiment. However, the video image switching device 54 of the present embodiment does not perform display control processing of FIG. 3 and performs display control processing depicted in a state transition diagram of FIG. 9 in place thereof.

The display control processing includes a CCM camera OFF state S310 and a CCM camera On state S320. The display control processing includes a low vehicle speed state S315 which is a child state of the CCM camera OFF state S310. The video image switching device 54 is in any of the CCM camera OFF state S310 and the CCM camera On state S320 during the display control processing. When being in the CCM camera OFF state S310, the video image switching device 54 may also be in the low vehicle speed state S315 or may not be in the low vehicle speed state S315.

First, the video image switching device 54 is in the CCM camera OFF state S310 at the time the display control processing starts. The video image switching device 54 in the CCM camera OFF state S310 sets a displaying state of a sub camera to be OFF and indirectly controls an image display device 12 via a navigation device 11 so as not to display an image captured by a sub camera 50 to an occupant of a vehicle (specifically, a driver and an occupant other than the driver, the same hereinafter). Specifically, an analog video image signal depicting an image which is captured by the sub camera 50 and is processed and output from an image processing circuit 51 is prohibited from being output to a rear-video image input terminal 11a.

The video image switching device 54 in the CCM camera OFF state S310 outputs an analog video image signal, depicting an image which is captured by the sub camera and is output from a rear camera 4, to the rear-video image input terminal 11a based on an output signal from a back-gear signal output unit 3 when a shift position is a reverse position.

The video image switching device 54 in the CCM camera OFF state S310 prohibits the analog video image signal, depicting an image which is captured by the sub camera and is output from the rear camera 4, from being output to the rear-video image input terminal 11a based on an output signal from the back-gear signal output unit 3 when the shift position is set to a position other than the reverse position.

Based on the above-described vehicle speed information, the video image switching device 54 in the CCM camera OFF state S310 is in the low vehicle speed state S315 when a vehicle speed is equal to or less than a first reference speed a (for example, 12 km per hour), and is in a state other than the low vehicle speed state S315 when the vehicle speed exceeds the first reference speed a.

Based on the above-described vehicle speed information, the video image switching device 54 in the CCM camera OFF state S310 is in the CCM camera OFF state S310 and the low vehicle speed state S315 when the vehicle speed is equal to or less than the first reference speed a (for example, 10 km per hour), and is in the CCM camera OFF state S310 and a state other than the low vehicle speed state S315 when the vehicle speed exceeds the first reference speed a.

When a display selector switch 53 is operated by the occupant of the vehicle, the video image switching device 54 in the low vehicle speed state S315 makes a transition from the low vehicle speed state S315 to the CCM camera On state S320 as indicated by an arrow T10.

When the shift position is changed from the reverse position to a position other than the reverse position based on an output signal from the back-gear signal output unit 3, the video image switching device 54 in the low vehicle speed state S315 makes a transition from the low vehicle speed state S315 to the CCM camera On state S320 as indicated by an arrow T15. The position other than the reverse position denotes a forward movement position, a neutral position, a parking position, and the like, for example.

In a state other than the low vehicle speed state S315 while being in the CCM camera OFF state S310, a state transition does not occur even though the display selector switch 53 is operated or the shift position is changed from the reverse position to a position other than the reverse position. In other words, when the vehicle speed exceeds the first reference speed a in the CCM camera OFF state S310, a state transition does not occur. The reason for this is that an image captured by the sub camera 50 does not need to be displayed to the occupant while the vehicle is moving.

The video image switching device 54 in the CCM camera On state S320 sets the displaying state of the sub camera to be ON and indirectly controls the image display device 12 via the navigation device 11 in order to display an image captured by the sub camera 50 to the occupant of the vehicle. Specifically, an analog video image signal depicting an image which is captured by the sub camera 50 and is processed and output from the image processing circuit 51 is output to the rear-video image input terminal 11a.

The video image switching device 54 in the CCM camera On state S320 prohibits an analog video image signal depicting an image which is captured by the sub camera and is output from the rear camera 4 from being output to the rear-video image input terminal 11a.

The video image switching device 54 in the CCM camera On state S320 makes a transition from the CCM camera On state S320 to the CCM camera OFF state S310 as indicated by an arrow T20 when the display selector switch 53 is operated by the occupant of the vehicle.

The video image switching device 54 in the CCM camera On state S320 makes a transition from the CCM camera On state S320 to the CCM camera OFF state S310 as indicated by an arrow T25 based on the above-described vehicle speed information when the vehicle speed is equal to or greater than a second reference speed a+m (for example, 12 km per hour).

The video image switching device 54 in the CCM camera On state S320 makes a transition from the CCM camera On state S320 to the CCM camera OFF state S310 as indicated by an arrow T30 based on an output signal from the back-gear signal output unit 3 when the shift position is changed from a position other than the reverse position to the reverse position.

The video image switching device 54 in the CCM camera On state S320 makes a transition from the CCM camera On state S320 to the CCM camera OFF state S310 as indicated by an arrow T35 at timing after a period of time in which the CCM camera On state S320 continues for a predetermined timer time (for example, a certain value such as 5 minutes) has elapsed.

A case example of the present embodiment will be described with reference to FIG. 10. As situations where the case example of FIG. 10 occurs, there are situations in which straightening of a steering wheel occurs, such as parallel parking, turning to the other side of a crank in a vehicle-width direction (driver's seat side), passing an oncoming vehicle on a narrow road, passing a parked vehicle on a narrow road, merging, course changing, cutting in, head-on parking, reverse parking, and a departure from a parked state.

First, the vehicle is assumed to gradually decelerate and stop during a period of time from a time t0 to a time immediately before a time t1. The shift position is set to the forward movement position at the time t0. However, since the vehicle speed exceeds the second reference speed a+m, the video image switching device 54 is in the CCM camera OFF state S310 during the display control processing. Therefore, the video image switching device 54 continues to be in the CCM camera OFF state S310 even during the period of time from the time t0 to a time immediately before the time t1 during the display control processing.

Therefore, the displaying state of the sub camera is OFF and an image captured by the sub camera 50 is not output from the video image switching device 54 to the rear-video image input terminal 11*a* during the period of time thereof. In addition, since the shift position is set to the forward movement position at all times during the period of time thereof, an image captured by the rear camera 4 is also not output to the rear-video image input terminal 11*a*.

Figure 2:
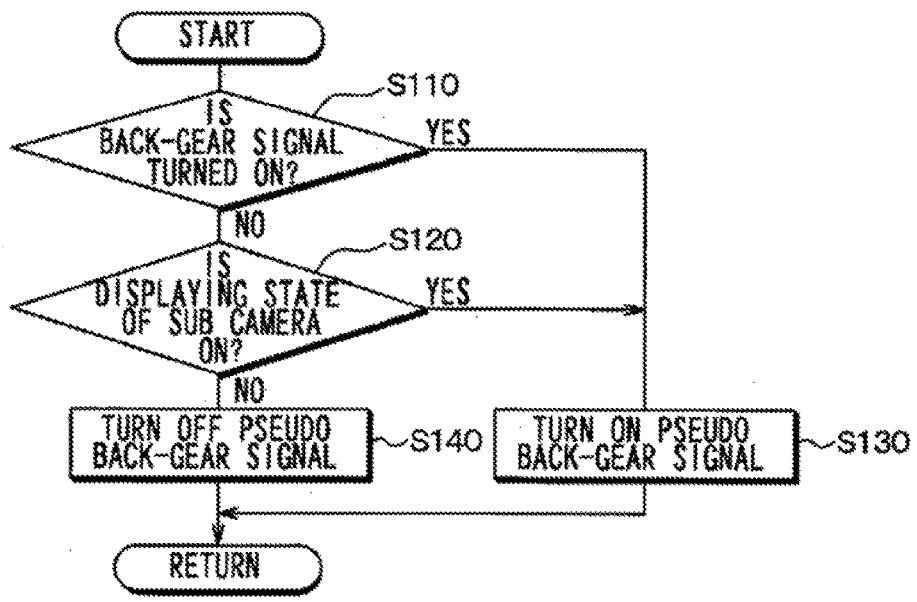
FIG. 2 is a flow chart of pseudo back-gear signal control processing.

In the video image switching device 54 during the period of time thereof, since a back-gear signal is turned off and the displaying state of the sub camera is also OFF during the processing of FIG. 2, the pseudo back-gear signal is turned off. Therefore, since a signal input to an REV input terminal 11*b* is turned off, the navigation device 11 does not cause the image display device 12 to display an image which is input to the rear-video image input terminal 11*a*, during the period of time thereof. Therefore, the image display device 12 displays neither an image captured by the rear camera 4 nor an image captured by the sub camera 50 during the period of time thereof.

At the time the vehicle speed becomes equal to or less than the first reference speed a during the period of time, the video image switching device 54 makes a transition from the CCM camera OFF state S310 and a state other than the low vehicle speed state S315 to the CCM camera OFF state S310 and the low vehicle speed state S315.

When it becomes the time t1, a driver changes the shift position from the forward movement position to the reverse position. Since no transition such as T10 and T15 occurs in this case as well, the video image switching device 54 is maintained in the low vehicle speed state S315 during the display control processing.

However, as a result of changing the shift position to the reverse position, the video image switching device 54 starts inputting an image captured by the rear camera 4 to the rear-video image input terminal 11*a* during the display control processing. The procedure proceeds from Step S110 to Step S130 during the processing of FIG. 2 along with the input, thereby switching the pseudo back-gear signal from OFF to ON. As a result thereof, the navigation device 11 starts causing the image display device 12 to display an image captured by the rear camera 4 which is input to the rear-video image input terminal 11*a*.

Thereafter, during a period of time from the time t1 to a time immediately before a time t2, the shift position is maintained while being set to the reverse position, and the vehicle stops or makes a slow reverse motion at a speed equal to or less than the first reference speed a.

During the period of time thereof, the video image switching device 54 continues to be in the low vehicle speed state S315 during the display control processing so that the displaying state of the sub camera is maintained to be OFF and an image captured by the rear camera 4 continues to be output to the rear-video image input terminal 11*a*. As a result thereof, the image display device 12 continues to display an image captured by the rear camera 4.

When it becomes the time t2, the driver changes the shift position from the reverse position to the forward movement position. Consequently, the video image switching device 54 makes a transition from the low vehicle speed state S315 to the CCM camera On state S320 during the display control processing.

As a result thereof, the video image switching device 54 in the CCM camera On state S320 switches the displaying state of the sub camera from OFF to ON and starts outputting an analog video image signal depicting an image captured by the sub camera 50 to the rear-video image input terminal 11*a*. In addition, the video image switching device 54 stops outputting an image captured by the rear camera 4 to the rear-video image input terminal 11*a*.

In the video image switching device 54 at the time t2, the back-gear signal is turned off during the processing of FIG. 2. However, the displaying state of the sub camera is ON. Therefore, the procedure proceeds from Step S120 to Step S130, thereby switching the pseudo back-gear signal from OFF to ON. Therefore, since a signal input to the REV input terminal 11*b* is turned on, the navigation device 11 causes the image display device 12 to start displaying an image captured by the sub camera 50 which is input to the rear-video image input terminal 11*a*. As a result thereof, the image display device 12 starts displaying an image captured by the sub camera 50 at the time t1.

Thereafter, the shift position is maintained while being set to the forward movement position during a period of time from the time t2 to a time immediately before a time t3, and the vehicle speed gradually rises from zero to a value slightly smaller than the second reference speed a+m.

During the period of time thereof, since the transitions T20, T25, 130, and T35 do not occur during the display control processing, the video image switching device 54 continues to be in the CCM camera On state S320. Therefore, the video image switching device 54 maintains the displaying state of the sub camera to be ON. The video image switching device 54 causes the image display device 12 to continuously display an image captured by the sub camera 50 without outputting an image captured by the rear camera 4 to the rear-video image input terminal 11*a*. The pseudo back-gear signal continues to be turned on during the processing of FIG. 2. As a result thereof, the image display device 12 continues to display an image captured by the sub camera.

When it becomes the time t3, in response to the vehicle speed reaching the second reference speed a+m, the video image switching device 54 makes a transition from the CCM camera On state S320 to the CCM camera OFF state S310 during the display control processing.

As a result thereof, the video image switching device 54 in the CCM camera OFF state S310 switches the displaying state of the sub camera from ON to OFF and stops outputting an analog video image signal depicting an image captured by the sub camera 50 to the rear-video image input terminal 11*a*.

In the video image switching device 54 at the time t3, the back-gear signal continues to be turned off during the processing of FIG. 2, and the displaying state of the sub camera is OFF. Therefore, the procedure proceeds from Step S120 to Step S140, thereby switching the pseudo back-gear signal from ON to OFF. Therefore, since a signal input to the REV input terminal 11*b* is turned off, the navigation device 11 no longer causes the image display device 12 to display an image captured by the sub camera 50 which is input to the rear-video image input terminal 11a. As a result thereof, the image display device 12 displays neither an image captured by the sub camera 50 nor an image captured by the rear camera 4.

Thereafter, the shift position is maintained while being set to the forward movement position, the vehicle stops, and the vehicle speed maintains a speed equal to or greater than the second reference speed a+m during a period of time after the time t3.

During the period of time thereof, the video image switching device 54 continues to be in the CCM camera OFF state S310, the displaying state of the sub camera is maintained to be OFF, and the shift position is set to be the forward movement position during the display control processing. Therefore, an image captured by the rear camera 4 is not output to the rear-video image input terminal 11a. As a result thereof, a state where the image display device 12 displays neither an image captured by the sub camera 50 nor an image captured by the rear camera 4 continues.

As described above, the video image switching device 54 of the present embodiment indirectly controls the image display device 12 in the CCM camera On state S320. Therefore, a captured image captured by the sub camera 50 is displayed to the occupant of the vehicle during a period of time t2-t3 in which the shift position of the vehicle is first switched from the reverse position to a position other than the reverse position and the position other than the reverse position is maintained.

As a result thereof, a captured image captured by the sub camera 50 is displayed to the occupant of the vehicle during the period of time the shift position of the vehicle is switched from the reverse position to a position other than the reverse position and the position other than the reverse position is maintained.

The inventor has examined that the circumstances where the shift position of the vehicle is switched from the reverse position to a position other than the reverse position are quite possibly the circumstances where the driver intends to move the vehicle forward after reversely moving the vehicle once. The reason the vehicle is reversely moved once is quite possibly to avoid a hindrance which may come into contact with the front end on the one side in the vehicle-width direction.

Therefore, displaying a captured image captured by the sub camera 50 to the occupant during the period of time the shift position is switched from the reverse position to a position other than the reverse position and the position other than the reverse position is maintained is greatly beneficial in order to allow the occupant to grasp the position of the hindrance. Therefore, in the above-described manner, an image captured by the CCM camera is capable of being shown to the occupant of the vehicle at suitable timing.

The video image switching device 54 indirectly controls the image display device 12 in the CCM camera OFF state S310 during the display control processing based on the fact that the shift position is set to the reverse position, thereby not displaying a captured image captured by the sub camera 50 to the occupant of the vehicle. The video image switching device 54 indirectly controls the image display device 12 in the CCM camera On state S320 during the display control processing at the timing the shift position is switched from the reverse position to a position other than the reverse position, thereby start displaying a captured image captured by the sub camera 50 to the occupant of the vehicle.

In this manner, when an image captured by the sub camera 50 starts being displayed to the occupant at the timing the shift position is switched from the reverse position to a position other than the reverse position, displaying an image captured by the sub camera 50 starts at timing in which a relationship between a front end on one side in the vehicle-width direction and a hindrance is desired to be checked. Therefore, the occupant can feel that suitable displaying starts at suitable timing so that the occupant highly evaluates displaying of an image captured by the sub camera 50.

Third Embodiment

Next, Third Embodiment will be described. The difference between a vehicle-system of the present embodiment and the vehicle-system of Second Embodiment is only the contents of display control processing performed by a video image switching device 54. Specifically, the video image switching device 54 of the present embodiment performs the display control processing depicted in a state transition diagram of FIG. 11 instead of the display control processing depicted in a state transition diagram of FIG. 9.

Figure 9:
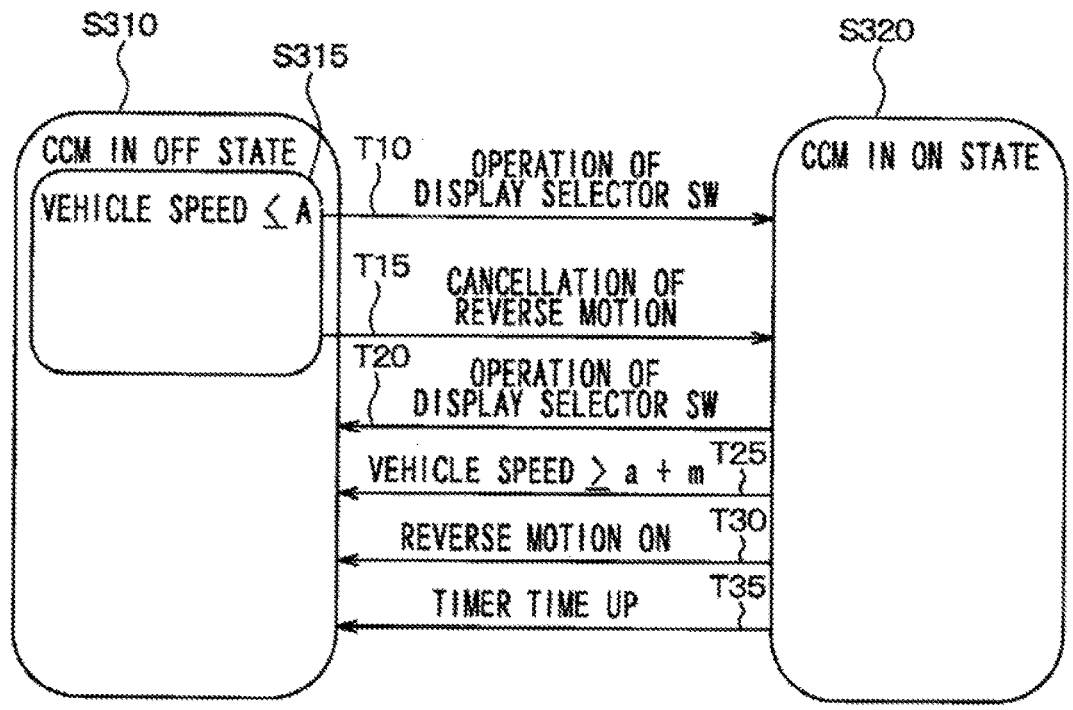
FIG. 9 is a state transition diagram of display control processing in Second Embodiment.
Figure 11:
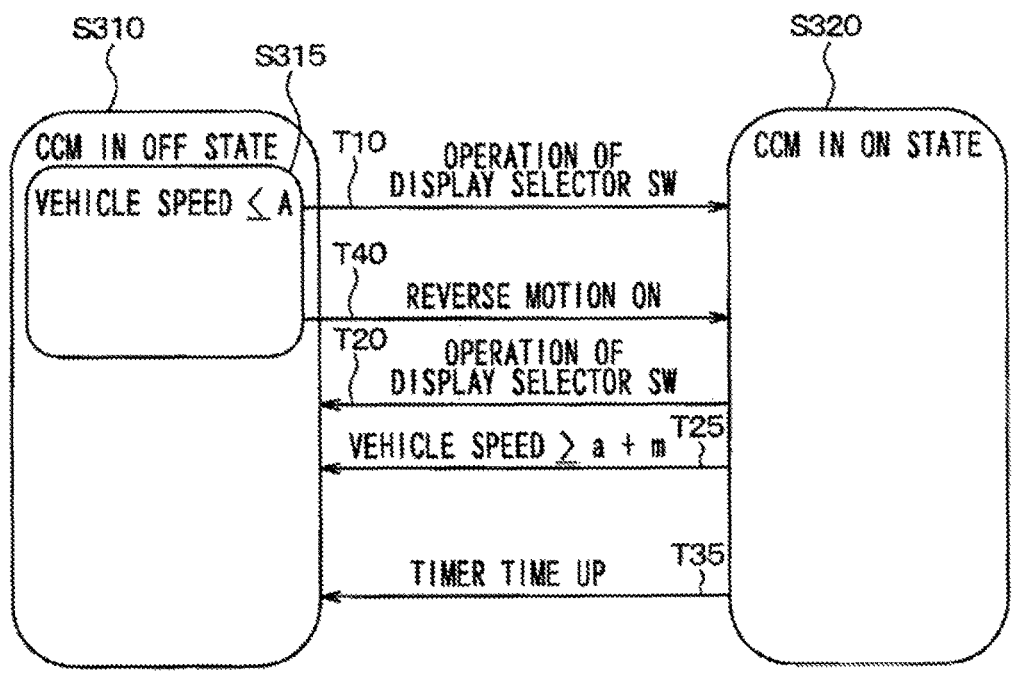
FIG. 11 is a state transition diagram of display control processing in Third Embodiment.

In processing illustrated in FIG. 11, transitions T15 and T30 are abolished and a transition T40 is added with respect to processing illustrated in FIG. 9. Hereinafter, the transition T40 will be described.

When the shift position is changed from the reverse position to a position other than the reverse position based on an output signal from the back-gear signal output unit 3, the video image switching device 54 in the low vehicle speed state S315 makes a transition from the low vehicle speed state S315 to the CCM camera On state S320 as indicated by an arrow T40. The position other than the reverse position denotes a forward movement position, a neutral position, a parking position, and the like, for example.

Furthermore, the processing illustrated in FIG. 11 is different from the processing illustrated in FIG. 9 in only the processing contents in the CCM camera On state S320 regarding the output of images captured by a rear camera 4 and an sub camera 50.

The point in which the video image switching device 54 in the CCM camera On state S320 sets displaying state of a sub camera to be ON and indirectly controls an image display device 12 via a navigation device 11 in order to display an image captured by the sub camera 50 to an occupant of a vehicle is the same as that in the processing of FIG. 9.

However, the point in which whether or not an analog video image signal depicting an image which is captured by the sub camera and is output from the rear camera 4 is also output to a rear-video image input terminal 11a is switched in accordance with whether the shift position is the reverse position or a position other than the reverse position is different from that in the processing of FIG. 9.

Specifically, when the shift position is set to a position other than the reverse position, the video image switching device 54 in the CCM camera On state S320 outputs only an image captured by the sub camera 50 to the rear-video image input terminal 11a similar to the processing of FIG. 9. In other words, an analog video image signal depicting an image which is captured by the sub camera 50 and is processed and output from an image processing circuit 51 is output to the rear-video image input terminal 11a, and a signal depicting an image which is captured by the rear camera and is output from the rear camera 4 is not output to the rear-video image input terminal 11a.

When the shift position is set to the reverse position, the video image switching device 54 in the CCM camera On state S320 outputs images captured by both the rear camera 4 and the sub camera 50 at the same time being different from the processing of FIG. 9.

The video image switching device 54 in the CCM camera On state S320 synthesizes an image in order to realize outputting of both an image captured by the sub camera 50 and an image captured by the rear camera 4 at the same time. For example, the video image switching device 54 downsizes an image which is captured by the sub camera 50 and is processed and output from the image processing circuit 51, thereby superimposing the downsized image onto a portion of an image which is captured by the rear camera and is output from the rear camera 4. As a result thereof, a synthesized image including both an image captured by the sub camera 50 and an image captured by the rear camera 4 is generated. The video image switching device 54 outputs an analog video image signal illustrating the synthesized image to the rear-video image input terminal 11a.

A case example of the present embodiment will be described with reference to FIG. 12. In the case example of FIG. 12, the changes of the vehicle speed and the shift position are the same as those in the case example of FIG. 10. However, since the contents of the display control processing are changed, a video image displayed by the image display device 12 is partially different therefrom.

Figure 10:
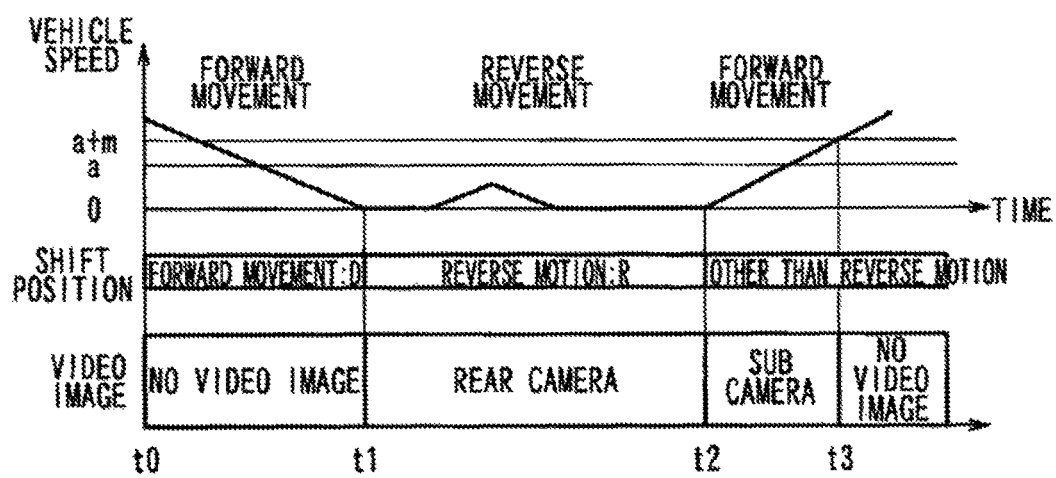
FIG. 10 is a diagram illustrating an example of a chronological change of a video image displayed to an occupant.

First, an operation during a period of time from a time t0 to a time immediately before the time t1 is the same as that in the case example of FIG. 10, the video image switching device 54 is in a CCM camera OFF state S310 during the display control processing and is in the low vehicle speed state S315 when the vehicle speed is equal to or less than a first reference speed a.

When it becomes the time t1, a driver changes the shift position from the forward movement position to the reverse position. Consequently, the transition T40 is generated during the display control processing, and the video image switching device 54 makes a transition from the low vehicle speed state S315 to the CCM camera On state S320.

As a result thereof, the video image switching device 54 in the CCM camera On state S320 switches the displaying state of the sub camera from OFF to ON and starts outputting an analog video image signal illustrating the above-described synthesized image to the rear-video image input terminal 11a based on the fact that the shift position is set to the reverse position.

In the video image switching device 54 at the time t1, since a back-gear signal is turned off during the processing of FIG. 2, the procedure proceeds from Step S110 to Step S130, thereby switching a pseudo back-gear signal from OFF to ON. Therefore, since a signal input to an REV input terminal 11b is turned on, the navigation device 11 causes the image display device 12 to start displaying a synthesized image which is input to the rear-video image input terminal 11a. As a result thereof, the image display device 12 starts displaying a synthesized image in which an image captured by the sub camera 50 and an image captured by the rear camera 4 are synthesized at the time t1.

Thereafter, during a period of time from the time t1 to a time immediately before a time t2, the shift position is maintained while being set to the reverse position, and the vehicle stops or makes a slow reverse motion at a speed equal to or less than the first reference speed a.

During the period of time thereof, since transitions T20, T25, and T35 are not generated, the video image switching device 54 continues to be in the CCM camera On state S320, the displaying state of the sub camera is maintained to be ON, and an analog video image signal illustrating the above-described synthesized image continues to be output to the rear-video image input terminal 11a during the display control processing. As a result thereof, the image display device 12 continues to display the synthesized image.

When it becomes the time t2, the driver changes the shift position from the reverse position to the forward movement position. At this time as well, since the transitions T20, T25, and T35 are not generated, the video image switching device 54 continues to be in the CCM camera On state S320 and maintains the displaying state of the sub camera to be ON during the display control processing. Therefore, displaying of an image captured by the sub camera 50 is not cancelled. However, since the shift position has been changed from the reverse position to the forward movement position, the video image switching device 54 outputs only an image captured by the sub camera 50 to the rear-video image input terminal 11a and no longer outputs an image captured by the rear camera 4 to the rear-video image input terminal 11a.

In the video image switching device 54 during the processing of FIG. 2, even though the back-gear signal is turned off, the displaying state of the sub camera remains to be ON. Therefore, the procedure proceeds from Step S120 to Step S130, thereby maintaining the pseudo back-gear signal to be turned on.

Therefore, since a signal input to the REV input terminal 11b remains to be turned on, the navigation device 11 starts causing the image display device 12 to display an image captured by the sub camera 50 which is input to the rear-video image input terminal 11a. At the same time, the navigation device 11 stops the image display device 12 from displaying the above-described synthesized image. As a result thereof, the image display device 12 starts displaying only an image captured by the sub camera 50 at the time t2. The operation during a period after the time t2 is the same as that in the case example of FIG. 10.

As described above, the video image switching device 54 of the present embodiment in the CCM camera On state S320 controls the image display device 12 based on the fact that the shift position is switched from a position other than the reverse position to the reverse position so as to start displaying a captured image captured by the sub camera 50 to the occupant of the vehicle, and subsequently thereto, even after the shift position is switched to a position other than the reverse position followed by a continued state of the reverse position, a captured image captured by the sub camera 50 is continuously displayed to the occupant of the vehicle.

In this manner, an image captured by the sub camera 50 starts being displayed at the time the shift position is set to the reverse position. Thereafter, an image captured by the sub camera 50 is capable of continuing to be displayed even after the shift position is switched to a position other than the reverse position followed by the continued state of the reverse position. As a result thereof, the driver can grasp a positional relationship between a front end on one side in a vehicle-width direction and a hindrance even immediately before the vehicle starts a reverse motion.

For example, in parallel parking, when the shift position is changed in the order of the forward movement position, the reverse position, and the forward movement position, since the vicinity of the front end on the one side in the vehicle-width direction is shown to the driver, parking is capable of being performed at ease. As a result thereof, unnecessary displaying of an image captured by the sub camera 50 is capable of being reduced, and the driver can see which the driver desires to see when the driver desires to see.

Fourth Embodiment

Next, Fourth Embodiment will be described. The difference between a vehicle-system of the present embodiment and the vehicle-system of Second Embodiment is only the contents of display control processing performed by a video image switching device 54. Specifically, the video image switching device 54 of the present embodiment performs the display control processing depicted in a state transition diagram of FIG. 13 instead of the display control processing depicted in a state transition diagram of FIG. 11.

Figure 13:
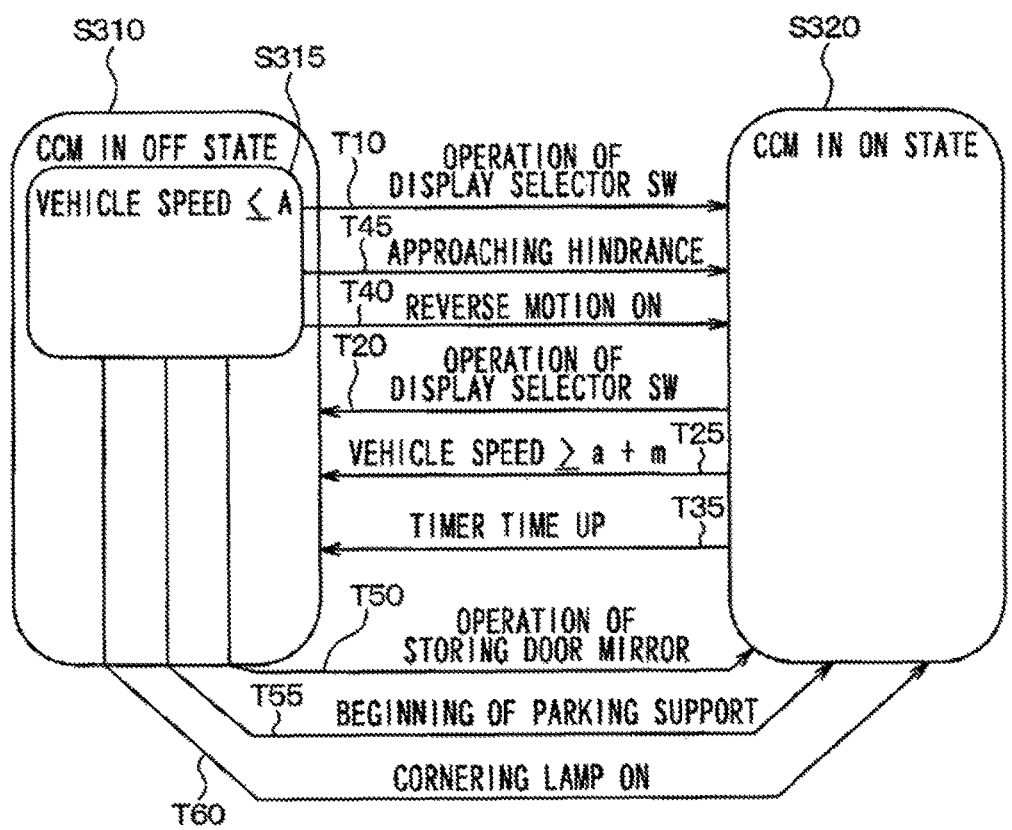
FIG. 13 is a state transition diagram of display control processing in Fourth Embodiment.

In processing illustrated in FIG. 13, transitions T45, T50, T55, and T60 are added with respect to processing illustrated in FIG. 11. Hereinafter, the added transitions T45, T50, T55, and T60 will be described.

The video image switching device 54 in a low vehicle speed state S315 acquires a distance from a hindrance to the end portion on the one side in the vehicle-width direction and the front end portion (specifically, the front left end portion) described above, from a clearance warning ECU 6. The video image switching device 54 determines whether the acquired distance is equal to or less than a threshold value distance. When the acquired distance is equal to or less than the threshold value distance, the video image switching device 54 makes a transition from the low vehicle speed state S315 to a CCM camera On state S320 as indicated by the arrow T45.

The reason for this is that when a hindrance approaches and the distance from the hindrance to the end portion on the one side in the vehicle-width direction and the front end portion becomes equal to or less than the threshold value distance, the necessity of showing a driver an image captured by the sub camera 50 increases.

The video image switching device 54 in the low vehicle speed state S315 makes a transition from the low vehicle speed state S315 to the CCM camera On state S320 as indicated by the arrow T50 based on the fact that storing operation generation information is received from a body ECU 8.

The reason for this is that when the driver performs an operation of storing a door mirror and the door mirror is stored, a vehicle is quite possibly parked. When the vehicle is parked, the driver quite possibly desires to check the distance between the vehicle and an object in the vicinity of the vehicle.

The video image switching device 54 in the low vehicle speed state S315 makes a transition from the low vehicle speed state S315 to the CCM camera On state S320 as indicated by the arrow T55 based on the fact that parking support start information is received from the body ECU 8.

The reason for this is that when parking support starts, that is, when the vehicle is at the point of being parked, the driver quite possibly desires to check the distance between the vehicle and an object in the vicinity of the vehicle.

The video image switching device 54 in the low vehicle speed state S315 makes a transition from the low vehicle speed state S315 to the CCM camera On state S320 as indicated by the arrow T60 based on the fact that lighting information of a cornering lamp on the one side in the vehicle-width direction is received from the body ECU 8.

The reason for this is that when the cornering lamp on the one side in the vehicle-width direction is lit, the vehicle is quite possibly turned to the one side. In such a case, the driver quite possibly desires to check the positional relationship between the vehicle and an object in the vicinity of the front end on the one side.

When the transitions T45, T50, T55, and T60 are generated, the video image switching device 54 in the CCM camera On state S320 sets the displaying state of the sub camera to be ON and outputs an analog video image signal depicting an image captured by the sub camera 50 to the rear-video image input terminal 11a as described above. Therefore, when the transitions T45, T50, T55, and T60 are generated, the image display device 12 starts displaying an image captured by the sub camera 50.

Fifth Embodiment

Next, Fifth Embodiment will be described. In a vehicle-system of the present embodiment, components other than a sub camera 50 are abolished from a captured-image processing device 5 of the vehicle-system of Third Embodiment.

Figure 14:
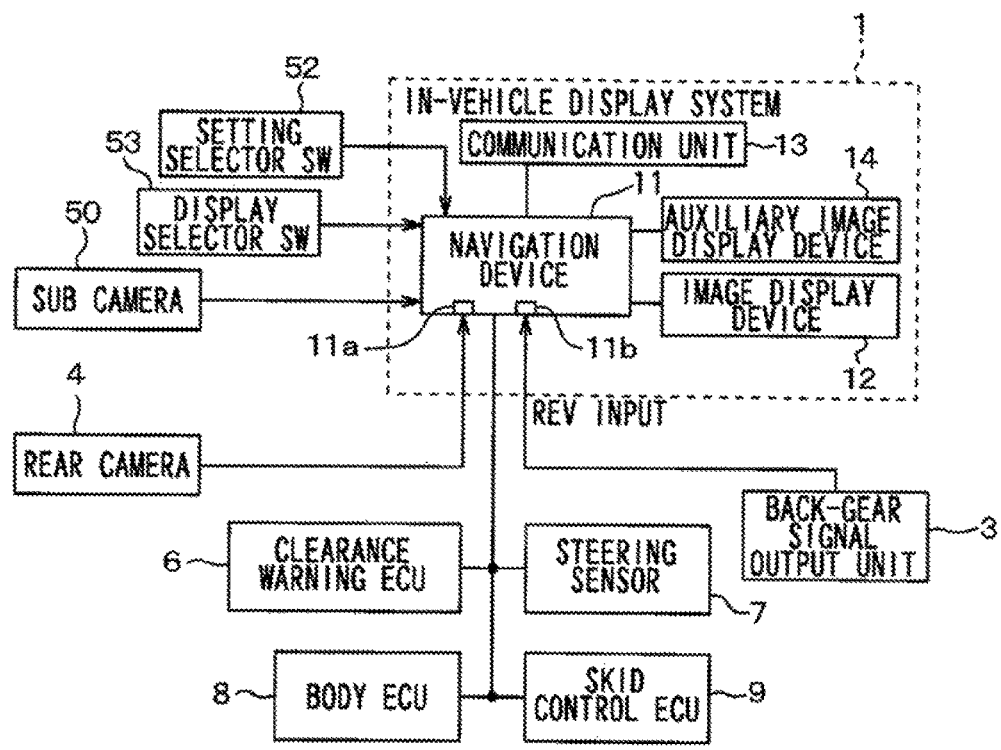
FIG. 14 is a configuration diagram of a vehicle-system according to Fifth Embodiment.

As illustrated in FIG. 14, outputs of a setting selector switch 52 and a display selector switch 53 are input to a navigation device 11, and images captured by a rear camera 4 and the sub camera 50 are directly input to the navigation device 11. An output of the back-gear signal output unit 3 is directly input to an REV input terminal 11b. A clearance warning ECU 6, a steering sensor 7, a body ECU 8, and a skid control ECU 9 are capable of communicating with the navigation device 11.

An in-vehicle display system 1 has an auxiliary image display device 14. The auxiliary image display device 14 is an additional image display device which is separated from an image display device 12. For example, the auxiliary image display device 14 is an in-mirror image display device (for example, a liquid crystal panel and a backlight) which is provided so as to be adjacent to a rear-view mirror inside a casing of the rear-view mirror. The rear-view mirror is a mirror being disposed inside a vehicle so that a driver can see the road in the rear of the vehicle.

As a form in which the in-mirror image display device is adjacent to the rear-view mirror, a form in which the in-mirror image display device overlaps the rear-view mirror and is interposed between the rear-view mirror and the casing may be adopted, or a form in which the in-mirror image display device does not overlap the rear-view mirror.

In the former form, the rear-view mirror is a half mirror. In the former form, when the backlight is not lit and the in-mirror image display device displays no image, the portion which overlaps the in-mirror image display device in the rear-view mirror also functions as a mirror similar to the remaining portion. However, when the backlight is lit and the in-mirror image display device displays an image, the portion which overlaps the in-mirror image display device in the rear-view mirror does not function as a mirror and transmits light coming out from the in-mirror image display device to the inside of the vehicle. In other words, in the former form, the in-mirror image display device displays an image through the rear-view mirror.

The configurations and functions of the back-gear signal output unit 3, the rear camera 4, the clearance warning ECU 6, the steering sensor 7, the body ECU 8, the skid control ECU 9, the image display device 12, a communication unit 13, the auxiliary image display device 14, the sub camera 50, the setting selector switch 52, and the display selector switch 53 are the same as those of Third Embodiment.

Similar to Third Embodiment, the navigation device 11 performs calculation of a guidance route and a display on a map. Similar to Third Embodiment, the navigation device 11 has a rear-video image input terminal 11a and the REV input terminal 11b. An analog video image signal of a captured image output by the rear camera 4 is directly input to the rear-video image input terminal 11a. A signal output by the back-gear signal output unit 3 is directly input to the REV input terminal 11b.

The navigation device 11 causes the image display device 12 to display an image captured by the rear camera 4 only when a shift position of the vehicle is set to a reverse position and a back-gear signal input to the REV input terminal 11b is turned on. When the shift position of the vehicle is set to a position other than the reverse position and the back-gear signal input to the REV input terminal 11b is turned off, the image display device 12 is prohibited from displaying an image captured by the rear camera 4. In other words, a result of whether or not the navigation device 11 causes the image display device 12 to display an image captured by the rear camera 4 is determined by only the difference whether the shift position is the reverse position or a position other than thereof.

The navigation device 11 executes display control processing which is partially changed display control processing of FIG. 11 executed by a video image switching device 54 of Third Embodiment. Specifically, in the display control processing executed by the navigation device 11 in the present embodiment as well, transitions T10, T20, T25, T35, and T40 are generated under the same conditions among a CCM camera OFF state S310, a low vehicle speed state S315, and a CCM camera On state S320. A transition between the low vehicle speed state S315 and a state other than the low vehicle speed state S315 is also generated under the same conditions within the CCM camera OFF state S310.

However, the processing contents in the CCM camera OFF state S310 are different from that of Third Embodiment. Specifically, the navigation device 11 in the CCM camera OFF state S310 controls the auxiliary image display device 14 so as not to display an image captured by the sub camera 50 to an occupant of the vehicle (specifically, a driver and an occupant other than the driver, the same hereinafter). As a result thereof, the auxiliary image display device 14 in the CCM camera OFF state S310 does not display an image captured by the sub camera 50.

The processing contents in the CCM camera On state S320 are different from that of Third Embodiment. Specifically, the navigation device 11 in the CCM camera On state S320 controls the auxiliary image display device 14 so as to display an image captured by the sub camera 50 to the occupant of the vehicle. As a result thereof, the auxiliary image display device 14 in the CCM camera On state S320 displays an image captured by the sub camera 50.

Figure 12:
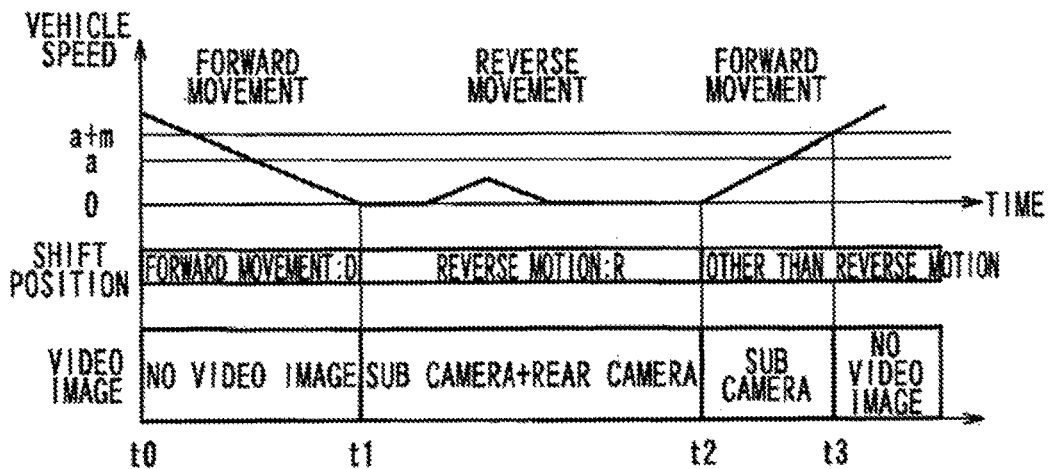
FIG. 12 is a diagram illustrating an example of a chronological change of a video image displayed to the occupant.

As a result thereof, in the case example of FIG. 12 in the present embodiment, the displaying contents of the image display device 12 of a period of time from a time t0 to a time immediately before a time t1, and a period of time after a time t2 are the same as those of Third Embodiment. However, during a period of time from the time t1 to a time immediately before the time t2, since the shift position is set to the reverse position and the navigation device 11 is in the CCM camera On state S320, the image display device 12 displays an image captured by the rear camera 4 and the auxiliary image display device 14 displays an image captured by the sub camera 50 at the same time.

In Second to Fourth Embodiments, the video image switching device 54 performs the above-described processing in the CCM camera OFF state S310, thereby functioning as an example of a CCM camera OFF device, and performs the above-described processing in the CCM camera On state S320, thereby functioning as an example of a CCM camera ON device. In Fifth Embodiment, the navigation device 11 performs the above-described processing in the CCM camera OFF state S310, thereby functioning as an example of the CCM camera OFF device, and performs the above-described processing in the CCM camera On state S320, thereby functioning as an example of the CCM camera ON device.

Other Embodiments

The present disclosure is not limited to the above-described embodiments and is capable of being suitably changed within the scope disclosed in Claims. In the above-described embodiments, it is needless to mention that an element including the embodiments is not necessarily an essential element excluding a case where it is clearly stated to be particularly essential and a case where it is considered to be obviously essential based on the principle. In the above-described embodiments, when a numerical value of the number, the numerical value, the quantity, the range, and the like of a configuration element of the embodiment is mentioned, the numerical value is not limited to the specified number excluding a case where it is clearly stated to be particularly essential and a case where it is obviously limited to the specified number based on the principle. In the above-described embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle. The present disclosure permits the following modification examples with respect to the above-described embodiments. The following modification examples are independently capable of selecting whether to be applied or not applied to the above-described embodiments. In other words, an arbitrary combination of the following modification examples is capable of being applied to the above-described embodiments.

First Modification Example

In the above-described embodiments, a corner clearance monitor camera (the sub camera 50) which is attached to the vicinity of a front left end portion of a vehicle and captures an image of the front left side is employed as a target on-board camera which controls a reference distance D. However, the target on-board camera which controls the reference distance D is not limited thereto and may be a different on-board camera. For example, the rear camera 4 may be adopted, a forward camera which captures an image right in front of the vehicle may be adopted, a side camera which captures an image of the side of the vehicle may be adopted, and a full-viewing camera which captures an image of the entire circumference of the vehicle may be adopted.

Second Modification Example

In the above-described embodiments, a video image switching device 54 further decreases a value of a third temporary reference distance D3 based on the most recent information on a type of a place where a current position belongs in a case where a vehicle is within a parking lot compared to a case where the vehicle is not in the parking lot (refer to Steps S215c and S215d of FIG. 8). However, most recent information on the type of the place where the current position belongs may be utilized in a different method, and the value of the third temporary reference distance D3 may be corrected.

For example, the video image switching device 54 may be caused to further increase the value of the third temporary reference distance D3 based on the most recent information on the type of the place where the current position belongs in a case where the vehicle is within an expressway compared to a case where the vehicle is not in the expressway (for example, when being on a road which is not an expressway). In an expressway, danger needs to be more promptly observed. Therefore, as a result thereof, the image display device 12 is capable of more actively displaying an image captured by the sub camera 50.

For example, the video image switching device 54 may be caused to decrease the value of the third temporary reference distance D3 based on the most recent information on the type of the place where the current position belongs in a case where the vehicle is in the midst of a congested road compared to a case where the vehicle is not in the midst of the congested road (when being on a road which is not congested). Other vehicles frequently come closer in a situation of traveling a congested road. Therefore, as a result thereof, the possibility of excessively frequent displaying of an image captured by the sub camera 50 (the on-board camera) is reduced in such a situation.

Third Modification Example

In the above-described embodiments, an in-vehicle display system 1 is a system having a navigation device 11. However, the in-vehicle display system 1 may be replaced with a system having a device other than the navigation device 11. For example, the in-vehicle display system 1 may be an audio system with a display or an inner mirror system with a display.

The audio system with a display has an audio control device, an image display device controlled by the audio control device, and a speaker. The audio control device selects a musical piece stored in a storage medium (flash memory, audio CD, or the like), reproduces the sound of the selected musical piece, and causes the speaker to output based on an operation of a user. The image display device displays information and the like regarding the reproduced musical piece.

The inner mirror system with a display has a mirror display control device and the in-mirror image display device which is described in Fifth Embodiment.

Both the audio control device and the mirror display control device have a rear-video image input terminal 11a and an REV input terminal 11b similar to the navigation device 11. The image display device 12 is caused to display an image input to the rear-video image input terminal 11a only when a signal input to the REV input terminal 11b is turned on. The image display device 12 is prohibited from displaying an image which is input to the rear-video image input terminal 11a when a signal input to the REV input terminal 11b is turned off.

Fourth Modification Example

In the above-described embodiments, a video image signal input from a video image switching device 54 to a rear-video image input terminal 11a is an analog signal. However, the signal may also be a digital signal.

Fifth Modification Example

The above-described Second Embodiment exemplifies a case where a certain value is applied as a timer time for determining a transition T35. The timer time may not be a constant value in Second to Fifth Embodiments. For example, the timer time may vary in accordance with a shift position. More specifically, when the shift position is set to a forward movement position, the timer time may be set to be shorter than a case of a neutral position. When the shift position is set to the neutral position, the timer time may be set to be shorter than a case of a parking position.

Sixth Modification Example

In the above-described Second to Fourth Embodiments, the video image switching device 54 causes the image display device 12 to display nothing after a time t3. However, the image display device 12 is not necessarily caused to display nothing. The image display device 12 may display a bird's-eye view or the like in which a vehicle and the surroundings thereof are viewed from above, for example, as long as the displaying image is other than an image captured by the sub camera 50.

In the above-described Fifth Embodiment, the navigation device 11 causes the auxiliary image display device 14 to display nothing after the time t3. However, the auxiliary image display device 14 is not necessarily caused to display nothing. The auxiliary image display device 14 may display a bird's-eye view or the like in which the vehicle and the surroundings thereof are viewed from above, for example, as long as the displaying image is other than an image captured by the sub camera 50.

Seventh Modification Example

In the above-described Second to Fifth Embodiments, a sub camera 50 is provided on only one side in a vehicle-width direction. However, an additional sub camera may be provided on the other side in the vehicle-width direction.

The additional sub camera is a corner clearance monitor camera (that is, a CCM camera) which captures an image in a direction different from those of both the rear camera 4 and the sub camera 50. The additional sub camera is attached to an attachment position at an end portion on the other side in the vehicle-width direction and a front end portion. The additional sub camera captures an image of the other side in the vehicle-width direction and a front side from the attachment position. The other side in the vehicle-width direction denotes a side opposite to the above described one side in the vehicle-width direction, that is, a side where a driver's seat is located. Accordingly, the image-capturing range of the additional sub camera covers the end portion on the other side in the vehicle-width direction and the front end portion, and the other side in the vehicle-width direction and the front side viewed from the vehicle.

In Second to Fourth Embodiments, an image captured by the additional sub camera may be input to the video image switching device 54, and the video image switching device 54 may control the image display device 12 to display or not to display an image captured by the additional sub camera by causing the control to coincide with an image captured by the sub camera 50.

In Fifth Embodiment, an image captured by the additional sub camera may be input to the navigation device 11, and the navigation device 11 may control the image display device 12 to display or not to display an image captured by the additional sub camera by causing the control to coincide with an image captured by the sub camera 50.

Eighth Modification Example

The above-described Fifth Embodiment is a changed example of Third Embodiment. The change applied to Fifth Embodiment is capable of being applied to Second and Fourth Embodiments other than Third Embodiment.

Ninth Modification Example

The transitions T45, T50, T55, and T60 in Fourth Embodiment may be generated in the display control processing in Second and Fifth Embodiments.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An image switching device for a vehicle comprising:
    a reference distance determination device that determines a reference distance; and
    a determination device that prohibits an image display device from displaying an image captured by an on-board camera, based on a feature that a detection distance from an object to a vehicle is longer than the reference distance, and allows the image display device to display the image captured by the on-board camera, based on a feature that the detection distance is shorter than the reference distance,
    wherein the reference distance determination device shortens the reference distance in a case where an absolute value of acceleration of the vehicle is a second value which is greater than a first value, compared to a case where the absolute value of acceleration of the vehicle is the first value.

* * * * *